(12) United States Patent
Oda et al.

(10) Patent No.: US 8,823,743 B2
(45) Date of Patent: Sep. 2, 2014

(54) IMAGE PROCESSING DEVICE AND METHOD, AND PROGRAM

(75) Inventors: Yasumasa Oda, Nagano (JP); Hirohito Kondo, Nagano (JP); Daisuke Kurosaki, Nagano (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 12/890,157

(22) Filed: Sep. 24, 2010

(65) Prior Publication Data

US 2011/0080427 A1  Apr. 7, 2011

(30) Foreign Application Priority Data

Oct. 2, 2009 (JP) ................ P2009-230939
Oct. 2, 2009 (JP) ................ P2009-230940

(51) Int. Cl.
| G09G 5/00 | (2006.01) |
| G06F 3/0488 | (2013.01) |
| G06F 3/0484 | (2013.01) |
| G06Q 10/10 | (2012.01) |

(52) U.S. Cl.
CPC ........ *G06F 3/04883* (2013.01); *G06F 3/04886* (2013.01); *G06F 3/04845* (2013.01); *G06Q 10/107* (2013.01)
USPC .......................................... 345/634; 345/629

(58) Field of Classification Search
CPC ... G06Q 10/107; G06T 11/60; G06T 2200/24
USPC ................................................ 345/629–641
See application file for complete search history.

(56) References Cited

U.S. PATENT DOCUMENTS 6,223,213 B1 * 4/2001 Cleron et al. ................ 709/206
7,334,190 B2 * 2/2008 Wierowski ................... 715/712
7,380,212 B2 * 5/2008 Cody et al. ................... 715/752
7,409,110 B2 * 8/2008 Kayahara ..................... 382/305
7,434,160 B2 * 10/2008 Peiro et al. ................... 715/249
7,512,661 B1 * 3/2009 Phillips ........................ 709/206

(Continued)

FOREIGN PATENT DOCUMENTS

| JP | WO 2008/001905 A1 * | 1/2008 | ............. G06F 15/16 |
| JP | 2008-117240 | 5/2008 | |
| JP | 2008-146453 | 6/2008 | |

OTHER PUBLICATIONS

U.S. Appl. No. 13/082,855, filed Apr. 8, 2011, Oda, et al.

(Continued)

*Primary Examiner* — Xiao Wu
*Assistant Examiner* — Charles Tseng
(74) *Attorney, Agent, or Firm* — Oblon, Spivak, McClelland, Maier & Neustadt, L.L.P.

(57) ABSTRACT

Disclosed herein is an image processing device having a display section and an image pickup section, the image processing device including: an operating section configured to generating an operating signal on a basis of contact of a user with the display section; a bulletin board display controlling section configured to display a bulletin board for posting an image message on the display section, and display an image message generated in advance on the bulletin board; a picked-up image display controlling section configured to display an image being picked up by the image pickup section on the bulletin board when an operating element for transition to an image pickup mode, the operating element being displayed within the bulletin board, is operated; and an image message generating section configured to subject the displayed the image to a predetermined edit, and generate an image message.

15 Claims, 20 Drawing Sheets

(56) References Cited

U.S. PATENT DOCUMENTS

| | | | |
|---|---|---|---|
| 7,576,755 B2* | 8/2009 | Sun et al. | 345/629 |
| 7,644,364 B2* | 1/2010 | Patten et al. | 715/726 |
| 7,778,453 B2* | 8/2010 | Camus et al. | 382/128 |
| 8,035,657 B2* | 10/2011 | Vau et al. | 345/629 |
| 8,099,468 B2* | 1/2012 | Iwasawa et al. | 709/206 |
| 8,161,400 B2* | 4/2012 | Kwon | 715/769 |
| 8,184,096 B2* | 5/2012 | Louch | 345/157 |
| 2007/0035764 A1* | 2/2007 | Aldrich et al. | 358/1.15 |
| 2008/0136790 A1 | 6/2008 | Hio | |

OTHER PUBLICATIONS

"What's the Microsoft Touch Pack for Windows 7?" http://windows.microsoft.com/en-us/windowns7/whats-the-microsoft-touch-pack-for-windows-7, 1 page, Oct. 29, 2009.

* cited by examiner

FIG. 6
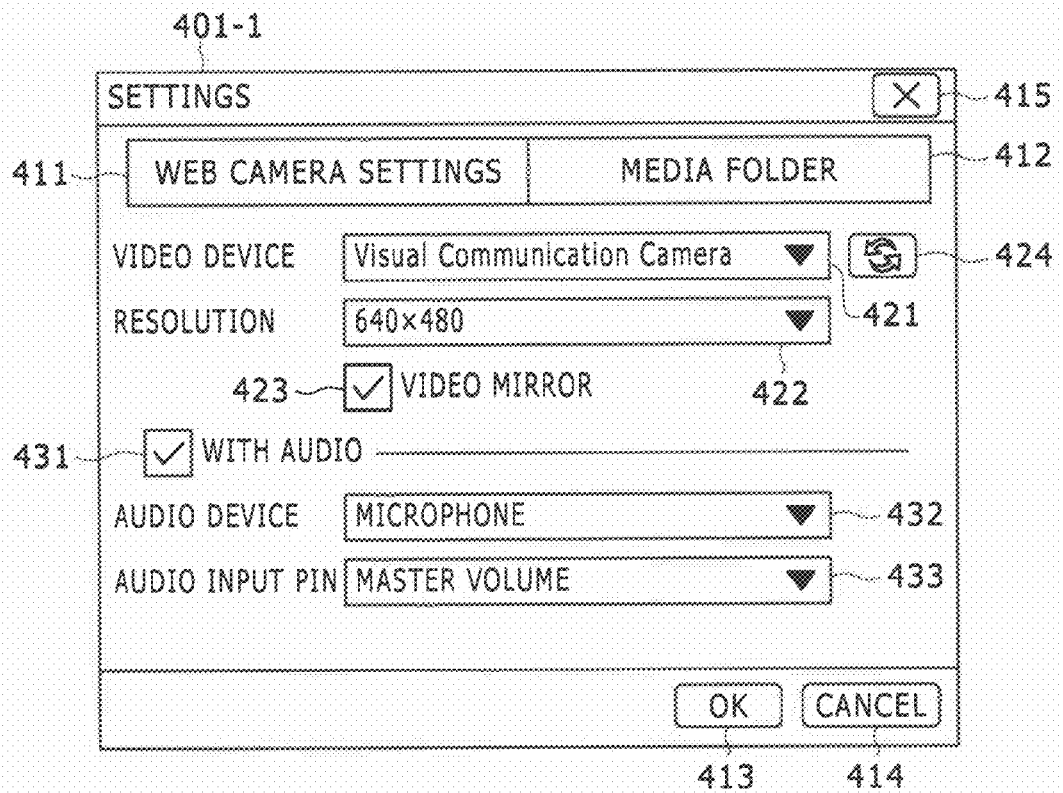
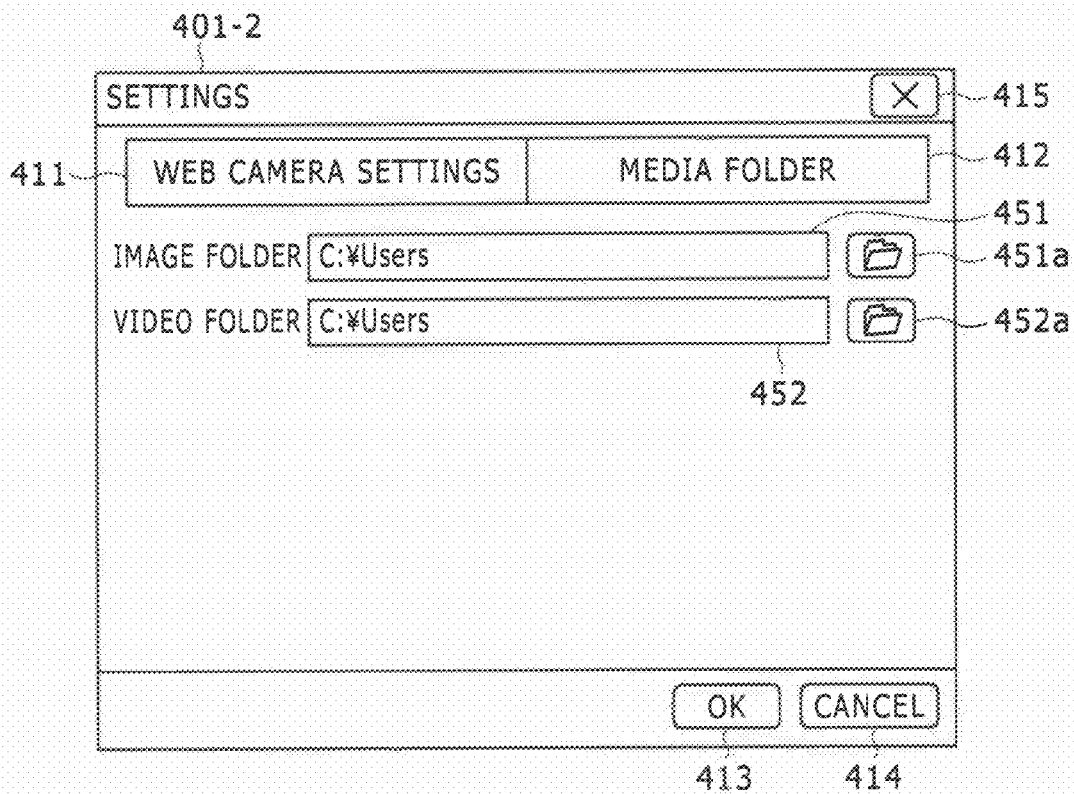

FIG. 15
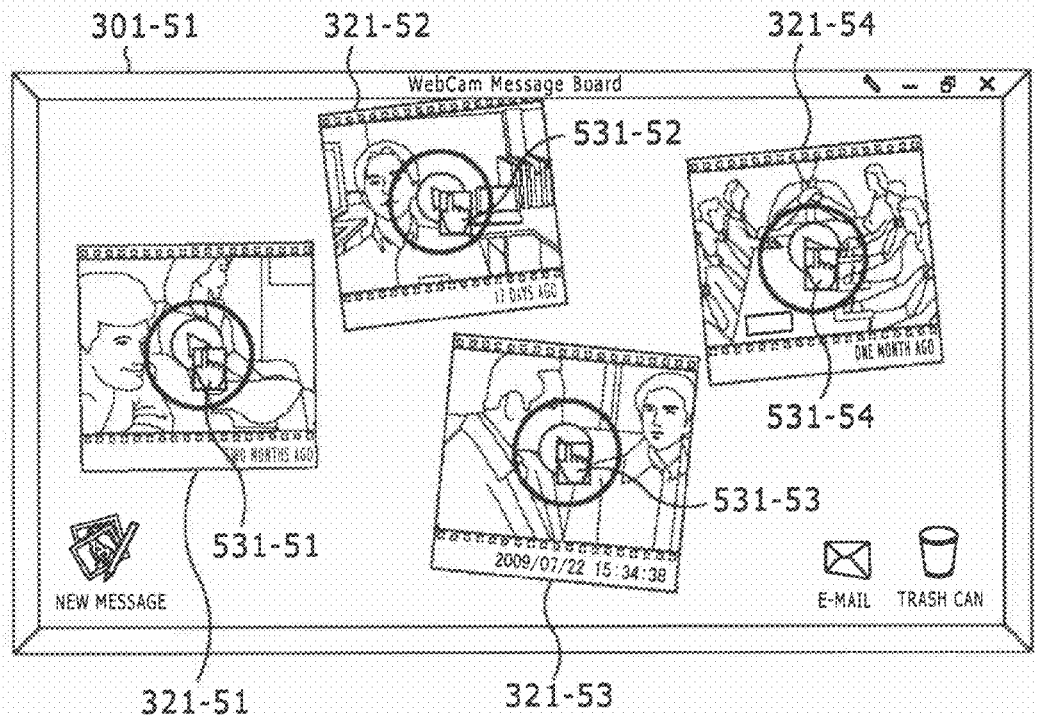
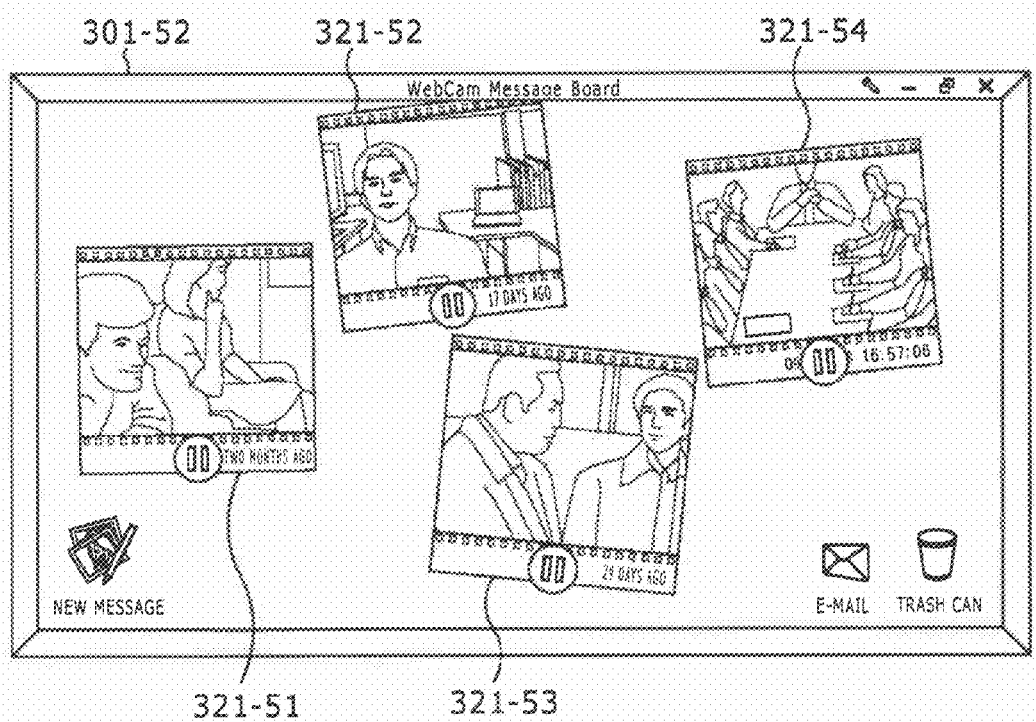

FIG.16
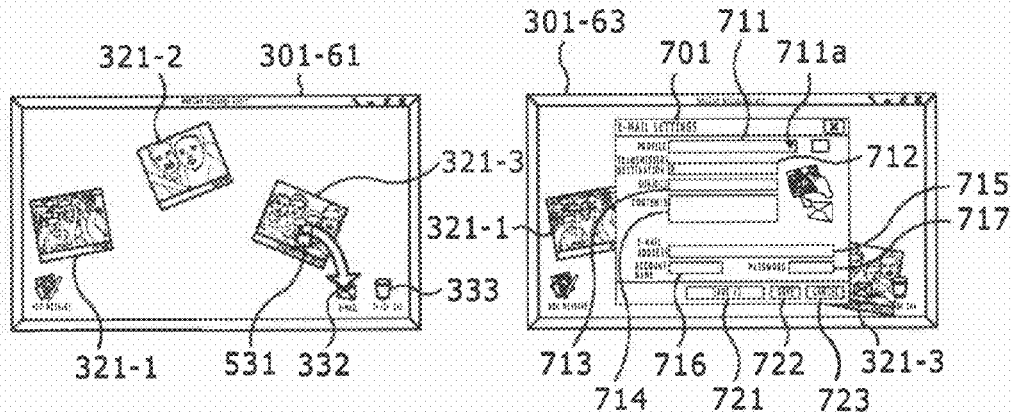
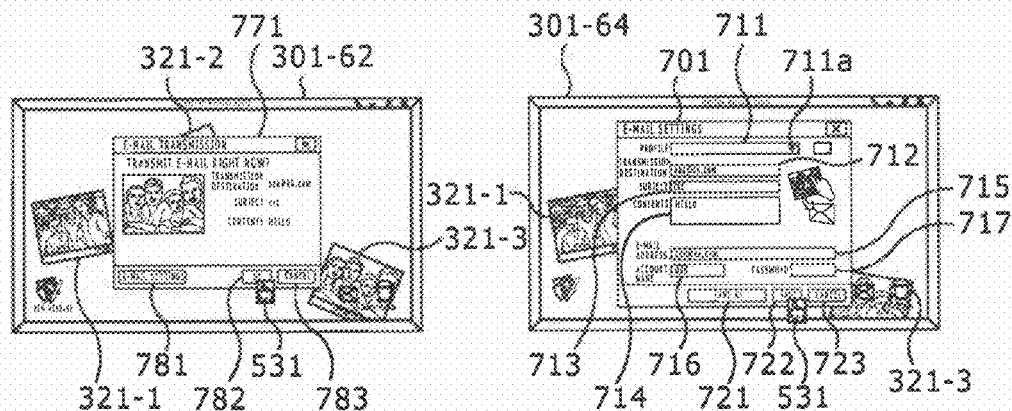
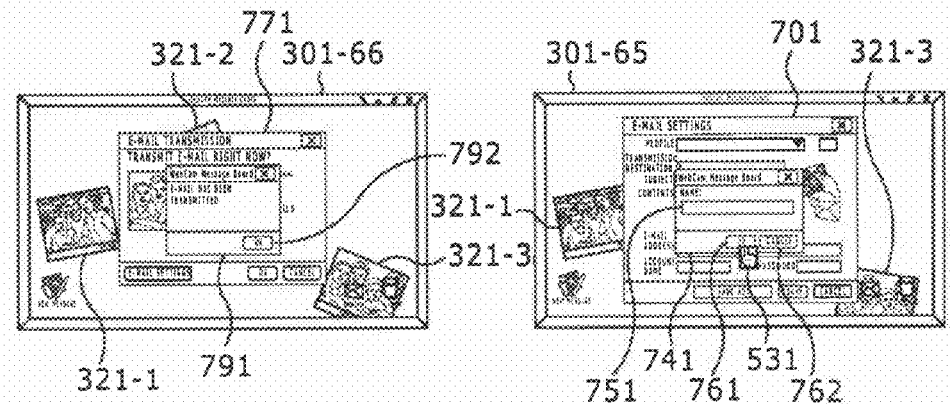

FIG.18
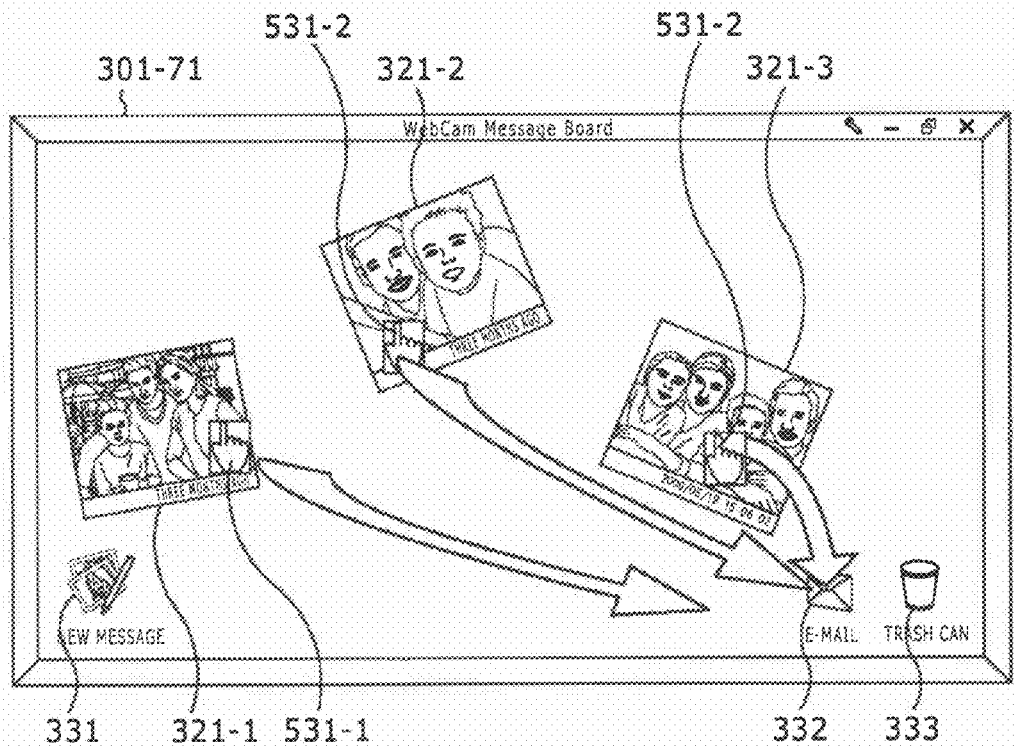
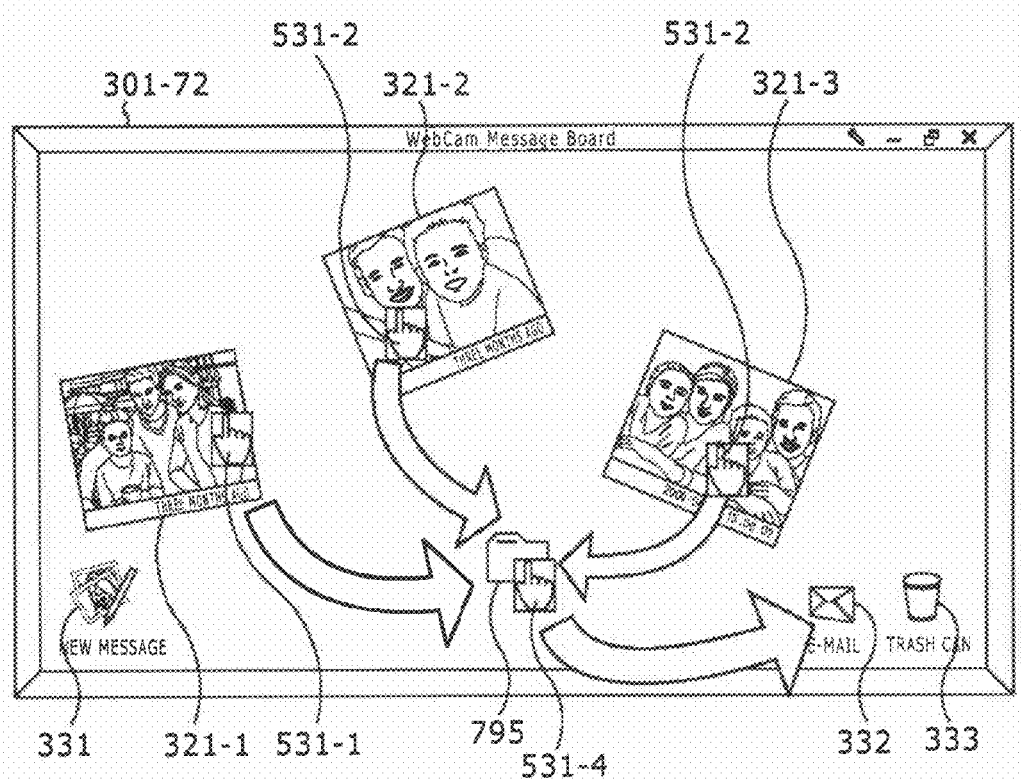

IMAGE PROCESSING DEVICE AND METHOD, AND PROGRAM

BACKGROUND OF THE INVENTION

1. Field of the Invention

The present invention relates to a device and a method for image display and a program, and particularly to a device and a method for image display and a program that make it possible easily to attach a still image or a moving image picked up in real time to an electronic mail and transmit the electronic mail.

2. Description of the Related Art

Techniques for attaching an image message composed of a still image or a moving image to an electronic mail and transmitting the electronic mail are in widespread use.

In related art, when a still image or a moving image is attached and transmitted as an image message of an electronic mail, a user first inputs a transmission destination, a subject, and a body and generates the electronic mail by operating a keyboard, operating buttons and the like of an electronic device such as a personal computer. The user next selects a desired image to be attached and transmitted by operating the keyboard, the operating buttons and the like. Then, the user performs an operation of attaching the selected image message to the generated electronic mail and thereafter performs an operation of transmitting the electronic mail by operating the keyboard, the operating buttons and the like.

In selecting the image at this time, making a plurality of still images picked up in advance displayed as a list of thumbnail images, selecting a desired thumbnail image, and making the selected image displayed is proposed (see Japanese Patent Laid-Open No. 2008-146453).

The user selects an image message to be attached by such a method, thereafter performs an operation of attaching the selected image message to an electronic mail, and then transmits the electronic mail.

In addition, a device referred to as a so-called touch panel in which a display section and an operating input section of an electronic device are integral with each other allows various commands to be input by touching the surface of the display section in association with display information as a displayed result of processing of the electronic device. This touch panel displays a list of thumbnail images described above, and allows selection of an image by touching a part where a desired thumbnail image is displayed. A product referred to as Touch Pack (trademark), for example, is proposed as software thus using a touch panel (http://japanese.engadget.com/2009/05/28/windows-7-and-microsoft-touch-pack/).

SUMMARY OF THE INVENTION

An increasing number of recent electronic devices have a camera function for image pickup. Thus, there are more opportunities where a user picks up an image directly by an electronic device or the like, and attaches and transmits the image as an image message of an electronic mail.

However, when an electronic device is used by the above-described method, although an image picked up in advance can be selected, operations for picking up an image in real time, then generating an image message, attaching the image message to an electronic mail, and transmitting the electronic mail are complex and troublesome.

In a case of using an electronic device employing a touch panel combining a display function and an input operating function, in particular, the operations are more troublesome. Specifically, there is no other choice but to use a software keyboard or the like in order to pick up an image in real time on an electronic device, then edit a transmission destination address, a subject, and a body of an electronic mail, attach the picked-up image as an image message to the electronic mail, and transmit the electronic mail. The operations are therefore complex and troublesome.

In addition, more complex operation may be necessary to perform a process of generating an image message using an image picked up in real time, and it is not possible to edit an image picked up in real time and display and enjoy a result of the edit while viewing the image.

The present invention has been made in view of such a situation, and particularly makes it possible to pick up a still image or a moving image in real time, further edit the image, and easily create an image message to be attached to an electronic mail when an electronic device having an image pickup function and a touch panel is used. In addition, the present invention makes it possible to edit an image picked up in real time, and immediately display and enjoy a generated image message. Further, the present invention makes it possible to edit a transmission destination address, a subject, and a body of an electronic mail to which a created image message is attached and transmit the electronic mail by an easy operation when an electronic device having similar functions is used.

According to an embodiment of the present invention, there is provided an image processing device having a display section and an image pickup section, the image processing device including: operating means for generating an operating signal on a basis of contact of a user with the display section; bulletin board display controlling means for displaying a bulletin board for posting an image message on the display section, and displaying an image message generated in advance on the bulletin board; picked-up image display controlling means for displaying an image being picked up by the image pickup section on the bulletin board when an operating element for transition to an image pickup mode, the operating element being displayed within the bulletin board, is operated; and image message generating means for subjecting the displayed image to a predetermined edit, and generating an image message; wherein the bulletin board display controlling means displays the image message newly generated by the image message generating means on the bulletin board in addition to the image message generated in advance.

The image message generating means can subject the displayed image to a predetermined edit, and generate an image message to be attached to an electronic mail.

The image message generating means can generate an image message composed of a still image when the operating means generates an operating signal giving an instruction to capture the image being picked up by the image pickup section.

When the operating means generates an operating signal giving an instruction to start recording of the image being picked up by the image pickup section and giving an instruction to end the recording, the image message generating means can generate an image message composed of a moving image from timing in which the instruction to start the recording is given to timing in which the instruction to end the recording is given, the moving image being included in the image picked up by the image pickup section.

The image message generating means can apply one of addition of an illustration and an edit by processing including at least an animation image, a stamp image, a paint in a manner of a watercolor pen, a paint in a manner of a pen, and a frame to the image being picked up by the image pickup section on a basis of an operating signal generated by the operating means, and generate an image message from the edited image being picked up by the image pickup section on a basis of an operating signal generated by the operating means.

The bulletin board display controlling means can sequentially display image messages generated by the image message generating means such that the image messages overlap each other in time series in which the image messages are generated at random positions and in random sizes.

When one of a plurality of image messages being displayed is selected on a basis of an operating signal corresponding to an operation by contact of the user, the bulletin board display controlling means can display the image messages such that the selected image message is in a forefront.

When dragging of one of a plurality of image messages being displayed is recognized on a basis of an operating signal corresponding to an operation by contact of the user, the bulletin board display controlling means can move and display the corresponding image message so as to correspond to dragging movement within a display surface of the display section.

The image processing device can further include transmitting means for, when dragging of one of the image messages being displayed is recognized by the operating means on a basis of an operating signal corresponding to an operation by contact of the user, and the image message is moved and dropped at a predetermined position within the display surface of the display section, transmitting an electronic mail with the corresponding image message attached to the electronic mail.

According to an embodiment of the present invention, there is provided an image processing method of an image processing device having a display section and an image pickup section, the image processing method including: an operating step of generating an operating signal on a basis of contact of a user with the display section; a bulletin board display controlling step of displaying a bulletin board for posting an image message on the display section, and displaying an image message generated in advance on the bulletin board; a picked-up image display controlling step of displaying an image being picked up by the image pickup section on the bulletin board when an operating element for transition to an image pickup mode, the operating element being displayed within the bulletin board, is operated; and an image message generating step of subjecting the displayed image to a predetermined edit, and generating an image message; wherein a process of the bulletin board display controlling step displays the image message newly generated by a process of the image message generating step on the bulletin board in addition to the image message generated in advance.

According to an embodiment of the present invention, there is provided a program for making a computer controlling an image processing device having a display section and an image pickup section perform a process including: an operating step of generating an operating signal on a basis of contact of a user with the display section; a bulletin board display controlling step of displaying a bulletin board for posting an image message on the display section, and displaying an image message generated in advance on the bulletin board; a picked-up image display controlling step of displaying an image being picked up by the image pickup section on the bulletin board when an operating element for transition to an image pickup mode, the operating element being displayed within the bulletin board, is operated; and an image message generating step of subjecting the displayed image to a predetermined edit, and generating an image message; wherein a process of the bulletin board display controlling step displays the image message newly generated by a process of the image message generating step on the bulletin board in addition to the image message generated in advance.

In an embodiment of the present invention, an image processing device having a display section and an image pickup section generates an operating signal on a basis of contact of a user with the display section, displays a bulletin board for posting an image message on the display section, displays an image message generated in advance on the bulletin board, displays an image being picked up by the image pickup section on the bulletin board when an operating element for transition to an image pickup mode, the operating element being displayed within the bulletin board, is operated, subjects the displayed image to a predetermined edit, and generates an image message, wherein the newly generated image message is displayed on the bulletin board in addition to the image message generated in advance.

An image processing device according to an embodiment of the present invention may be an independent device, or may be a block performing image processing.

According to an embodiment of the present invention, there is provided an image processing device having a display section and an image pickup section, the image processing device including: operating means for generating an operating signal on a basis of contact of a user with the display section; bulletin board display controlling means for displaying a bulletin board for posting an image message on the display section, and displaying an image message generated in advance to be attached to an electronic mail on the bulletin board; storing means for storing setting information of the electronic mail; electronic mail generating screen displaying means for, when the operating means recognizes dragging of one of image messages being displayed on a basis of an operating signal corresponding to an operation by contact of the user, and the image message is moved and dropped at a predetermined position within a display surface of the display section, displaying a screen for generating the electronic mail to which the corresponding image message is attached on the bulletin board; and transmitting means for transmitting the electronic mail on a basis of the setting information of the electronic mail.

The setting information of the electronic mail can include one of a transmission destination address, a subject, and a body of the electronic mail.

The image processing device can further include setting means for setting the setting information of the electronic mail on a basis of an operating signal corresponding to an operation by contact of the user by the operating means, wherein the setting means can set the setting information of the electronic mail when the operating means recognizes dragging of one of the image messages being displayed on a basis of an operating signal corresponding to an operation by contact of the user, and the image message is moved and dropped at the predetermined position within the display surface of the display section, and when the setting information is not set or when an operating signal giving an instruction to set the setting information is generated.

When the operating means recognizes dragging of a plurality of image messages of the image messages being displayed on a basis of an operating signal corresponding to an operation by contact of the user, and the plurality of image messages are moved and dropped at the predetermined position within the display surface of the display section, the transmitting means can generate the electronic mail according to the setting information of the electronic mail, the setting information being stored by the storing means, and transmit the electronic mail with the plurality of corresponding image messages attached to the electronic mail.

When the operating means recognizes dragging of a folder in which a plurality of image messages of the image messages being displayed are dropped on a basis of an operating signal corresponding to an operation by contact of the user, and the folder is moved and dropped at the predetermined position within the display surface of the display section, the transmitting means can generate the electronic mail according to the setting information of the electronic mail, the setting information being stored by the storing means, and transmit the electronic mail with the plurality of image messages dropped in the corresponding folder attached to the electronic mail.

According to an embodiment of the present invention, there is provided an image processing method of an image processing device having a display section and an image pickup section, the image processing method including: an operating step of generating an operating signal on a basis of contact of a user with the display section; a bulletin board display controlling step of displaying a bulletin board for posting an image message on the display section, and displaying an image message generated in advance to be attached to an electronic mail on the bulletin board; a storing step of storing setting information of the electronic mail; an electronic mail generating screen displaying step of, when dragging of one of image messages being displayed is recognized by a process of the operating step on a basis of an operating signal corresponding to an operation by contact of the user, and the image message is moved and dropped at a predetermined position within a display surface of the display section, displaying a screen for generating the electronic mail to which the corresponding image message is attached on the bulletin board; and a transmitting step of transmitting the electronic mail on a basis of the setting information of the electronic mail.

According to an embodiment of the present invention, there is provided a program for making a computer controlling an image processing device having a display section and an image pickup section perform a process including: an operating step of generating an operating signal on a basis of contact of a user with the display section; a bulletin board display controlling step of displaying a bulletin board for posting an image message on the display section, and displaying an image message generated in advance to be attached to an electronic mail on the bulletin board; a storing step of storing setting information of the electronic mail; an electronic mail generating screen displaying step of, when dragging of one of image messages being displayed is recognized by a process of the operating step on a basis of an operating signal corresponding to an operation by contact of the user, and the image message is moved and dropped at a predetermined position within a display surface of the display section, displaying a screen for generating the electronic mail to which the corresponding image message is attached on the bulletin board; and a transmitting step of transmitting the electronic mail on a basis of the setting information of the electronic mail.

In an embodiment of the present invention, an image processing device having a display section and an image pickup section generates an operating signal on a basis of contact of a user with the display section, displays a bulletin board for posting an image message on the display section, displays an image message generated in advance to be attached to an electronic mail on the bulletin board, stores setting information of the electronic mail, when dragging of one of image messages being displayed is recognized on a basis of an operating signal corresponding to an operation by contact of the user, and the image message is moved and dropped at a predetermined position within a display surface of the display section, displays a screen for generating the electronic mail to which the corresponding image message is attached on the bulletin board, and transmits the electronic mail on a basis of the setting information of the electronic mail.

An image processing device according to the present invention may be an independent device, or may be a block performing image processing.

According to an embodiment of the present invention, it is possible to generate an image message to be attached to an electronic mail using an image being picked up in real time, and easily transmit the electronic mail to which the image message is attached in an electronic device using a touch panel. It is also possible to enjoy editing an image being picked up in real time and generate an image message while viewing the image, and immediately display and enjoy the generated image message.

BRIEF DESCRIPTION OF THE DRAWINGS

FIG. 6 is a diagram of assistance in explaining setting windows;

FIG. 15 is a diagram of assistance in explaining the message reproducing process;

FIG. 16 is a diagram of assistance in explaining a message transmitting process;

FIG. 18 is a diagram of assistance in explaining a message transmitting process for transmitting a plurality of image messages;

DETAILED DESCRIPTION OF THE PREFERRED EMBODIMENTS

[Example of Configuration of Image Processing Device]

Figure 1:
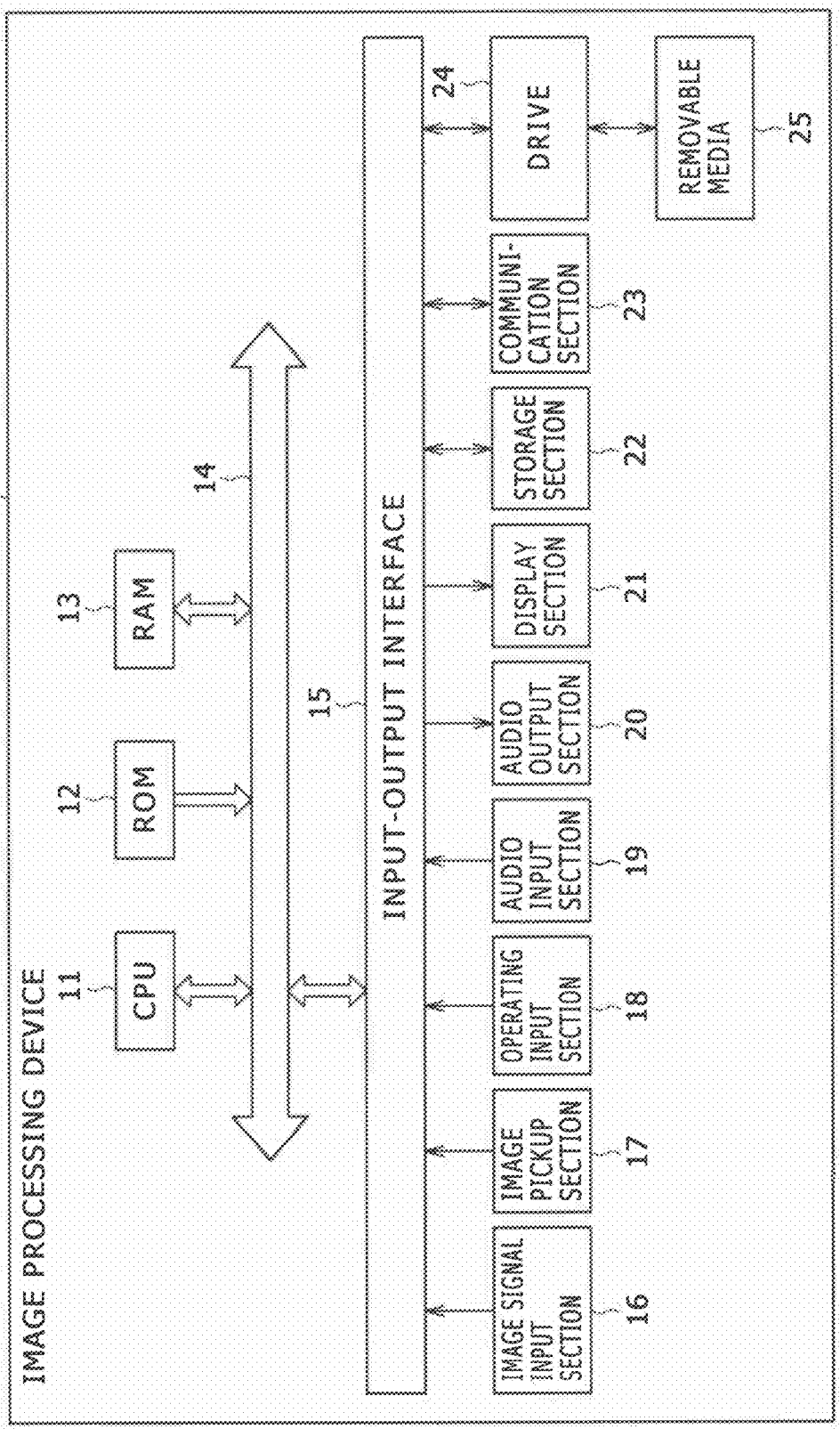
FIG. 1 is a diagram showing an external appearance of an image processing device to which an embodiment of the present invention is applied.

FIG. 1 shows an example of configuration of an embodiment of hardware of an image processing device to which the present invention is applied. The image processing device 1 of FIG. 1 includes a touch panel, and generates an image message on the basis of an image picked up in real time. In addition, the image processing device transmits an electronic mail with the generated image message attached to the electronic mail. That is, the image processing device 1 is for example a personal computer that includes a display formed by a touch panel and in which computer the display and a main unit are integral with each other. Incidentally, the image message in this case includes a still image message and a moving image message composed of only a still image and a moving image as well as an edited still image message and an edited moving image message resulting from edit processing by characters, illustrations, effect processing or the like. When the still image message, the moving image message, the edited still image message, and the edited moving image message do not particularly need to be distinguished from each other, these messages will hereinafter be referred to collectively as an image message. In addition, when it is not particularly necessary to distinguish whether edit processing is performed or not, the edited still image message and the still image message will each be referred to simply as a still image message. Further, when it is not particularly necessary to distinguish whether edit processing is performed or not, the edited moving image message and the moving image message will each be referred to simply as a moving image message.

The image processing device 1 includes a CPU (Central Processing Unit) 11, a ROM (Read Only Memory) 12, a RAM (Random Access Memory) 13, a bus 14, an input-output interface 15, an image signal input section 16, an image pickup section 17, an operating input section 18, and an audio input section 19. The image processing device 1 also includes an audio output section 20, a display section 21, a storage section 22, a communicating section 23, and a drive 24.

The CPU 11 controls the entire operation of the image processing device 1. The CPU 11 expands a program stored in the ROM 12 or the storage section 22 into the RAM 13 as appropriate and performs various kinds of processing as required. In addition, the CPU 11 executes various kinds of programs on the basis of signals input from various configurations connected via the bus 14 and the input-output interface 15, and outputs a result of processing from the various kinds of configurations via the bus 14 and the input-output interface 15.

The image signal input section 16 receives various kinds of image signals typified by an NTSC (National Television Standards Committee) system, an HDMI (High-Definition Multimedia Interface) system and the like, and supplies the received image signals to the CPU 11 or the storage section 22 as required. In addition, the image signal input section 16 supplies an input image signal to the display section 21 formed by an LCD (Liquid Crystal Display), an organic EL (Electro-Luminescence) display or the like to make the input image signal displayed.

The image pickup section 17 is formed by a CCD (Charge Coupled Device) image pickup element, a CMOS (Complementary Metal Oxide Semiconductor) image pickup element or the like. The image pickup section 17 picks up an image, and supplies the image to the CPU 11 or the storage section 22. In addition, the image pickup section 17 supplies the picked-up image to the display section 21 formed by an LCD, an organic EL display or the like to make the picked-up image displayed.

The operating input section 18 for example has input functions of a keyboard, a mouse and the like. The operating input section 18 generates an operating signal according to an operating content of a user, and supplies the operating signal to the CPU 11. Incidentally, in the present embodiment, the operating input section 18 and the display section 21 are integral with each other, and form a so-called touch panel 102 (see FIG. 2). That is, the touch panel not only displays necessary information but also displays operating buttons, switches and the like as a user interface, receives an input operation by contact of a user with the display position of an operating button or a switch, and generates an operating signal corresponding to the received input operation. The image pickup section 17 is disposed in an upper part of the touch panel 102, and picks up an image in a direction of facing the touch panel 102. That is, when a user is located in such a position as to face the touch panel 102, and is operating the touch panel 102, the image pickup section 17 picks up an image of the operating user from the front.

The audio input section 19 is for example a microphone or the like. The audio input section 19 receives audio input, and outputs the received audio as an audio signal. The display section 21 is formed by an LCD, an organic EL display or the like. The display section 21 is controlled by the CPU 11 to display images on the basis of image signals supplied from the image signal input section 16, the image pickup section 17, and the storage section 22.

The storage section 22 is for example formed by an HDD (Hard Disk Drive), an SSD (Solid State Drive) or the like. The storage section 22 is controlled by the CPU 11 to store various programs, setting data, image signals (including still images and moving images), and audio signals and read the various programs, the setting data, the image signals, and the audio signals as required.

The communicating section 23 is formed by an Ethernet board or the like. The communicating section 23 is controlled by the CPU 11 to communicate with another electronic device via a public telephone line, the Internet or the like not shown in the figure and thereby send and receive various kinds of data. The data sent and received by communication with the other electronic device includes data of electronic mail to and from the other electronic device.

The drive 24 is controlled by the CPU 11 to read and write data on removable media 25 such as a magnetic disk (including flexible disks), an optical disk (including CD-ROM (Compact Disc-Read Only Memory) and DVD (Digital Versatile Disc)), a magneto-optical disk (including MD (Mini Disc)), a semiconductor memory and the like.

[Example of Configuration of Functions Implemented by Image Processing Device]

Figure 2:
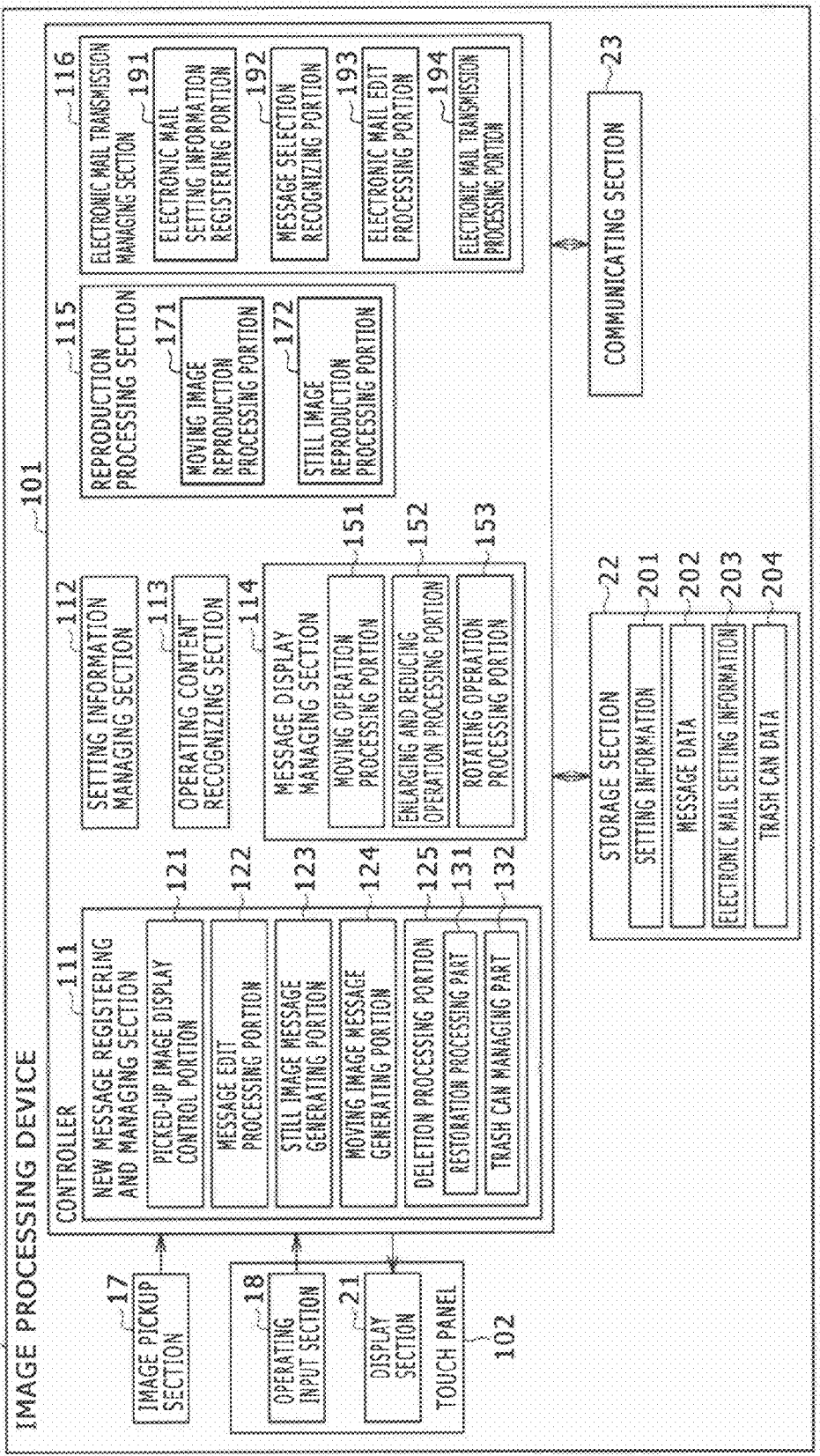
FIG. 2 is a diagram showing an example of configuration of functions implemented by the image processing device of FIG. 1.

An example of configuration of functions implemented by the hardware of the image processing device 1 of FIG. 1 will next be described with reference to a functional block diagram of FIG. 2. Incidentally, while each configuration of the functional block diagram of FIG. 2 is implemented by the execution of various programs by the hardware of the image processing device 1 of FIG. 1, hardware having similar functions may be configured. Thus, the functional block diagram of FIG. 2 may be treated as a block diagram of functions implemented by a program, or may be treated as a block diagram of hardware having similar functions.

The image processing device 1 includes a controller 101, the touch panel 102, the image pickup section 17, the storage section 22, and the communicating section 23. The controller 101 controls the entire operation of the image processing device 1. On the basis of operating signals supplied from the touch panel 102, the controller 101 generates an image message to be attached to electronic mail, attaches the generated image message to an electronic mail, and transmits the electronic mail from the communicating section 23.

The controller 101 includes a new message registering and managing section 111, a setting information managing section 112, an operating content recognizing section 113, a message display managing section 114, a reproduction processing section 115, and an electronic mail transmission managing section 116.

The new message registering and managing section 111 generates a new image message, registers the new image message as message data 202 in the storage section 22, and manages the message data 202. The new message registering and managing section 111 includes a picked-up image display control portion 121, a message edit processing portion 122, a still image message generating portion 123, a moving image message generating portion 124, and a deletion processing portion 125. The picked-up image display control portion 121 controls an image displayed on the display section 21 on the basis of an image picked up by the image pickup section 17 when generating a new image message.

The message edit processing portion 122 edits an image on the basis of an operating signal from the touch panel 102 when editing the image picked up as a new image message, and registers the edited image as message data 202.

The still image message generating portion 123 generates an image message on the basis of a still image picked up by the image pickup section 17, registers the image message as message data 202 in the storage section 22, and also displays the image message on the display section 21. The moving image message generating portion 124 generates an image message on the basis of a moving image picked up by the image pickup section 17, registers the image message as message data 202 in the storage section 22, and also displays the image message on the display section 21.

The deletion processing portion 125 manages a process of deleting message data 202 stored in the storage section 22 by throwing the message data 202 into a trash can to be described later or restoring the message data 202. More specifically, the deletion processing portion 125 includes a restoration processing part 131 and a trash can managing part 132. When a generated message is thrown into the trash can (dragged and dropped onto an icon indicating the trash can), the trash can managing part 132 treats the message as deleted, deletes the message on the display section 21, and registers the message as trash can data 204 in the storage section 22. Then, when an instruction for a trash can managing process is given, the trash can managing part 132 reads trash can data 204 in the storage section 22, and displays a list of deleted messages. When an instruction for deletion is given on the basis of an operation of the operating input section 18, the trash can managing part 132 deletes the message data registered in the trash can data 204, and thereby completely erases the message data. On the other hand, when an instruction for restoration is given, the restoration processing part 131 reads and restores the data of a message whose restoration is indicated from the trash can data 204, and displays the message in an original state on the display section 21.

The setting information managing section 112 registers and manages, in the storage section 22, setting information for setting the type of the image pickup section 17 used to create new messages, a folder within the storage section 22 which folder stores message data, and the like.

The operating content recognizing section 113 recognizes an operating content on the basis of an operating signal supplied from the operating input section 18 forming the touch panel 102, and outputs the recognized operating content. Specifically, the operating content recognizing section 113 recognizes an operation performed on a button or an icon being displayed from correspondence between a position touched by a user on the display screen of the display section 21 and a position on a displayed image and contact pressure. More specifically, the operating content recognizing section 113 recognizes for example a pressing operation, a dragging operation, or a dropping operation on a button or an icon on the display section 21.

The message display managing section 114 displays a message board in the form of a bulletin board set as a region for displaying image messages (message board display region) in the display region of the display section 21, and manages a state of display of the image messages displayed on the message board. More specifically, the message display managing section 114 manages a state of display of image messages generated in advance on the basis of the message data 202 in the storage section 22. Further, the message display managing section 114 displays an image message newly generated by the new message registering and managing section 111 in addition to the display of the image messages generated in advance, and manages a state of display of the newly generated image message. More specifically, the message display managing section 114 includes a moving operation processing portion 151, an enlarging and reducing operation processing portion 152, and a rotating operation processing portion 153. The moving operation processing portion 151 moves an image message to a display position and makes the image message displayed at the display position according to an operating content input to the operating input section 18. The enlarging and reducing operation processing portion 152 enlarges or reduces the display size of an image message and makes the image message displayed in the enlarged or reduced display size according to an operating content input to the operating input section 18. The rotating operation processing portion 153 rotates an image message to a display angle and makes the image message display at the display angle according to an operating content input to the operating input section 18.

The reproduction processing section 115 reproduces an image message composed of a still image and an image message composed of a moving image among image messages so as to correspond to respective operating contents input to the operating input section 18.

The electronic mail transmission managing section 116 attaches an image message to an electronic mail and transmits the electronic mail according to an operating content input to the operating input section 18. More specifically, the electronic mail transmission managing section 116 includes an electronic mail setting information registering portion 191, a message selection recognizing portion 192, an electronic mail edit processing portion 193, and an electronic mail transmission processing portion 194. The electronic mail setting information registering portion 191 registers the setting information of an electronic mail to which an image message is attached as electronic mail setting information 203 in the storage section 22. The electronic mail setting information includes the information of a transmission destination address, a subject, and a body. The electronic mail setting information is managed by profile name in the storage section 22. The message selection recognizing portion 192 recognizes a selection of an image message according to an operating content of the operating input section 18. The electronic mail edit processing portion 193 edits the information of a transmission destination address, a subject, and a body included in the electronic mail setting information according to an operating content of the operating input section 18. When an instruction to transmit electronic mail is given according to an operating content of the operating input section 18, the electronic mail transmission processing portion 194 controls the communicating section 23, attaches a selected image message to an electronic mail, and transmits the electronic mail on the basis of the electronic mail setting information.

[Message Managing Process]

A message managing process will next be described with reference to a flowchart of FIG. 3.

In step S1, the message display managing section 114 determines whether an instruction for a start of the message managing process is given by the operating content recognizing section 113, and repeats a similar process until an instruction for a start of the message managing process is given. Then, when an operating button displayed on the touch panel 102 but not shown in the figures which operating button gives an instruction to start the message managing process is operated by a user in step S1, the operating input section 18 in step S2 generates a corresponding operating signal, and supplies the operating signal to the controller 101. At this time, when the operating content recognizing section 113 recognizes that an instruction for a start of the message managing process is given on the basis of the operating signal, the operating content recognizing section 113 notifies the message display managing section 114 that an instruction for a start of the message managing process is given. The message display managing section 114 displays a message board 301 as shown in FIG. 4, for example, according to the notification indicating that an operation for giving an instruction to start the message managing process is recognized from the operating content recognizing section 113.

Figure 4:
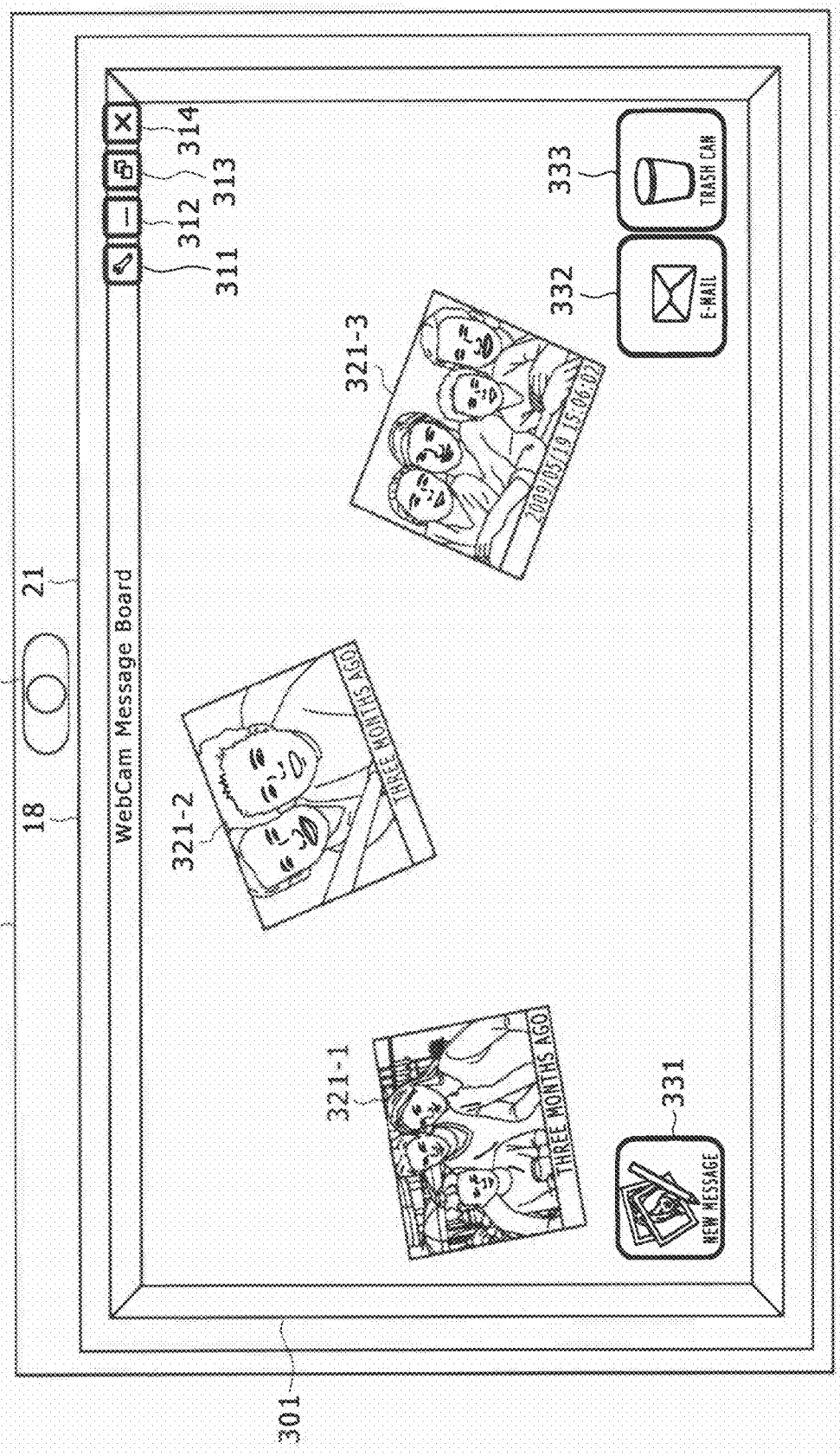
FIG. 4 is a diagram of assistance in explaining an example of display of a main board.

Incidentally, FIG. 4 shows a state of the touch panel 102 displaying the message board 301. The touch panel 102 has the image pickup section 17 in an upper part of the casing part of the touch panel 102. The image pickup section 17 therefore picks up an image of a range opposed to a surface forming the operating input section 18 and the display section 21 (the operating input section 18 and the display section 21 are the same in FIG. 4). As a result, the image pickup section 17 in effect picks up an image of a user operating or viewing the touch panel 102 of the image processing device 1.

In step S3, the message display managing section 114 reads the message data 202 stored in the storage section 22, and displays image messages 321-1 to 321-3 on the message board 301, as shown in FIG. 4, for example.

In FIG. 4, an image of what appears to be a family of three is shown in the image message 321-1, and is described as an image three months ago on a lower right side, which indicates that the image message composed of the image of what appears to be a family of three was generated three months ago. Incidentally, the message display managing section 114 displays the description "three months ago" in the lower part on the basis of a date and time when the image message 321-1 was generated.

In addition, an image of what appears to be the two of a parent and a child is shown in the image message 321-2, and is described as an image three months ago on a lower right side, which indicates that the image message composed of the image of what appears to be the two of a parent and a child was generated three months ago. Further, an image of what appears to be a family of four is displayed in the image message 321-3, and 2009/5/19 15:06:02 is displayed on a lower right side. This indicates that the image message 321-3 of what appears to be a family of four was generated 6 minutes and 2 seconds past 15 on May 19, 2009.

Incidentally, when the image messages 321-1 to 321-3 do not particularly need to be distinguished from each other, the image messages 321-1 to 321-3 will hereinafter be referred to simply as image messages 321, and other configurations will be referred to similarly. In addition, as will be described later, in the case of an image message composed of moving image data, the message display managing section 114 further displays a reproducing button of a triangular shape pointing to the right around the center of the image message 321. Such a difference in display makes it possible to distinguish whether an image message 321 is based on still image data or based on moving image data at a glance.

In addition, buttons 311 to 314 are displayed from the left on the upper right of the message board 301. The button 311 is pressed when setting information is to be displayed. The button 312 is pressed when the message board 301 is minimized. The button 313 is pressed when the message board 301 is maximized or returned to an original size. The button 314 is pressed at a time of ending. These buttons 311 to 314 are recognized to be pressed when a user touches regions in which the buttons 311 to 314 are displayed with a fingertip or the like on the display section 21 of the touch panel 102 as described above. Incidentally, in the present embodiment, other buttons and the like can be pressed by a similar operation.

Further, an icon 331 for giving an instruction to generate a new message, an icon 332 for giving an instruction to transmit electronic mail to which an image message is attached, and an icon 333 for giving an instruction to throw an image message into the trash can are displayed on the message board 301.

The icon 331 is pressed by a pointer not shown in FIG. 4 when a user desires to create a new image message. An image message selected by a user is dropped onto the icon 332 when an instruction to transmit electronic mail to which the image message selected by the user is attached is given. That is, in the case of FIG. 4, when one of the image messages 321-1 to 321-3 is dragged and dropped on the icon 332, an instruction to transmit electronic mail to which the dropped image message 321 is attached is given.

Further, an image message selected by a user is dropped onto the icon 333 when the image message selected by the user is to be thrown into the trash can. That is, in the case of FIG. 4, when one of the image messages 321-1 to 321-3 is dragged and dropped on the icon 333, an instruction to throw the dropped image message 321 into the trash can is given.

Incidentally, a drag in this case refers to an operation of selecting one of the image messages 321 and moving the image message 321 within the display region of the display section 21, and a drop refers to an operation of ending the movement of the image message 321 by freeing the image message 321 from the selected state and placing the image message 321 at a movement position within the display region.

By thus displaying the message board 301, image messages 321 can be displayed as if a bulletin board were actually provided and pictures were stuck on the bulletin board. Incidentally, the position, size, and rotation angle of the image messages 321 on the message board 301 are randomly set by the message display managing section 114 for display. In FIG. 4, there are only three image messages 321, and therefore space on the message board 301 has room and a space is left even when all of the three image messages 321 are displayed. However, when a large number of image messages 321 are displayed, the image messages 321 may overlap one another. In such a case, the message display managing section 114 displays the image messages 321 such that a new image message 321 is displayed in front of an old image message 321 on the basis of information on dates and times when the image messages 321 were created. That is, a newest image message 321 is displayed in the forefront, and an oldest image message 321 is displayed in the rearmost position. Thus, the atmosphere of a more real bulletin board can be represented.

Figure 3:
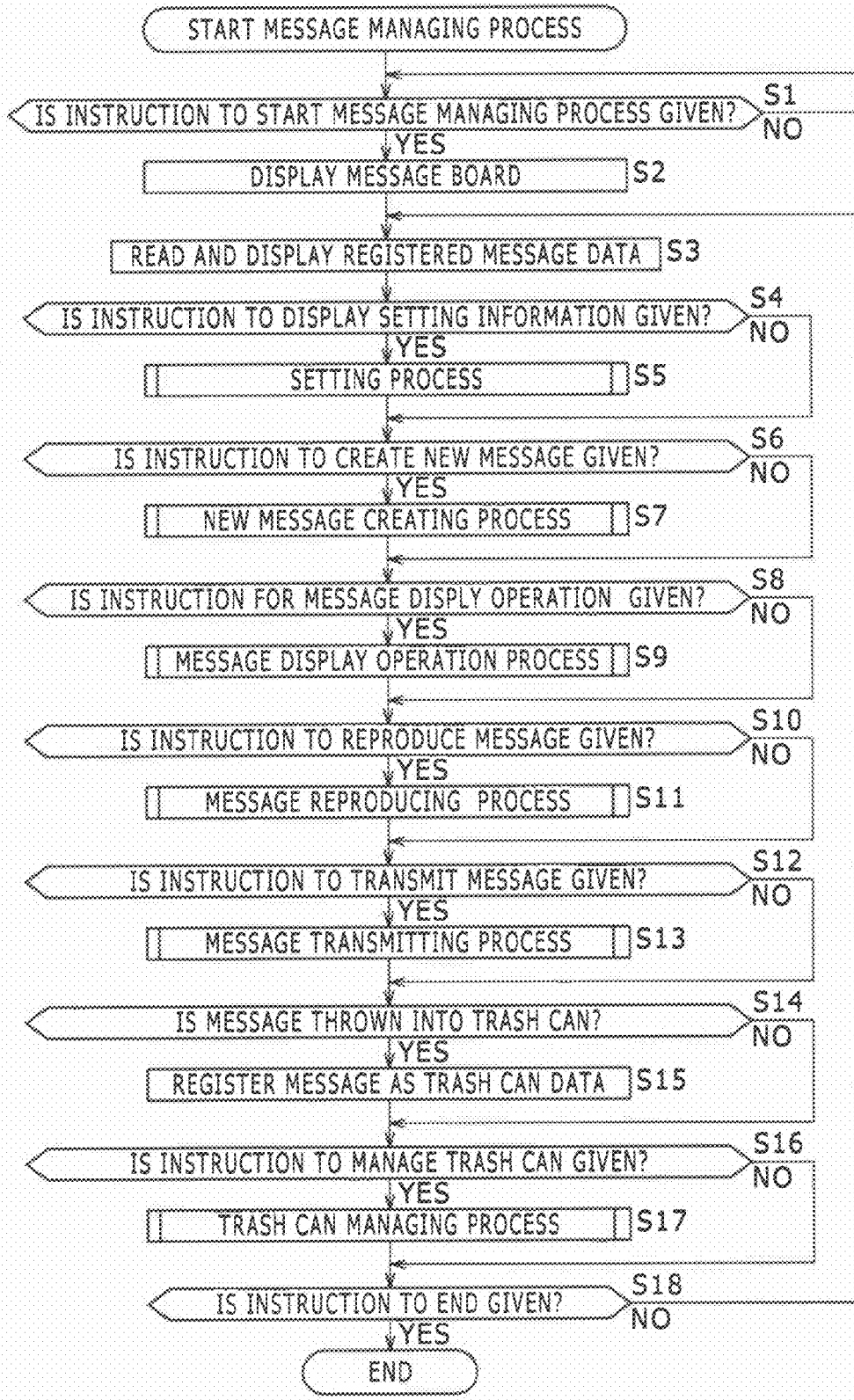
FIG. 3 is a flowchart of assistance in explaining a message managing process.

Description will now return to the flowchart of FIG. 3.

In step S4, the setting information managing section 112 determines whether an instruction to display setting information is given by the operating content recognizing section 113. That is, the setting information managing section 112 determines whether an instruction to display setting information is given by operating the button 311 on the message board 301 displayed on the display section 21 of the touch panel 102 by the operating input section 18.

When an instruction to display setting information is given by operating the button 311, for example, in step S4, the setting information managing section 112 in step S5 performs a setting process.

[Setting Process]

Figure 5:
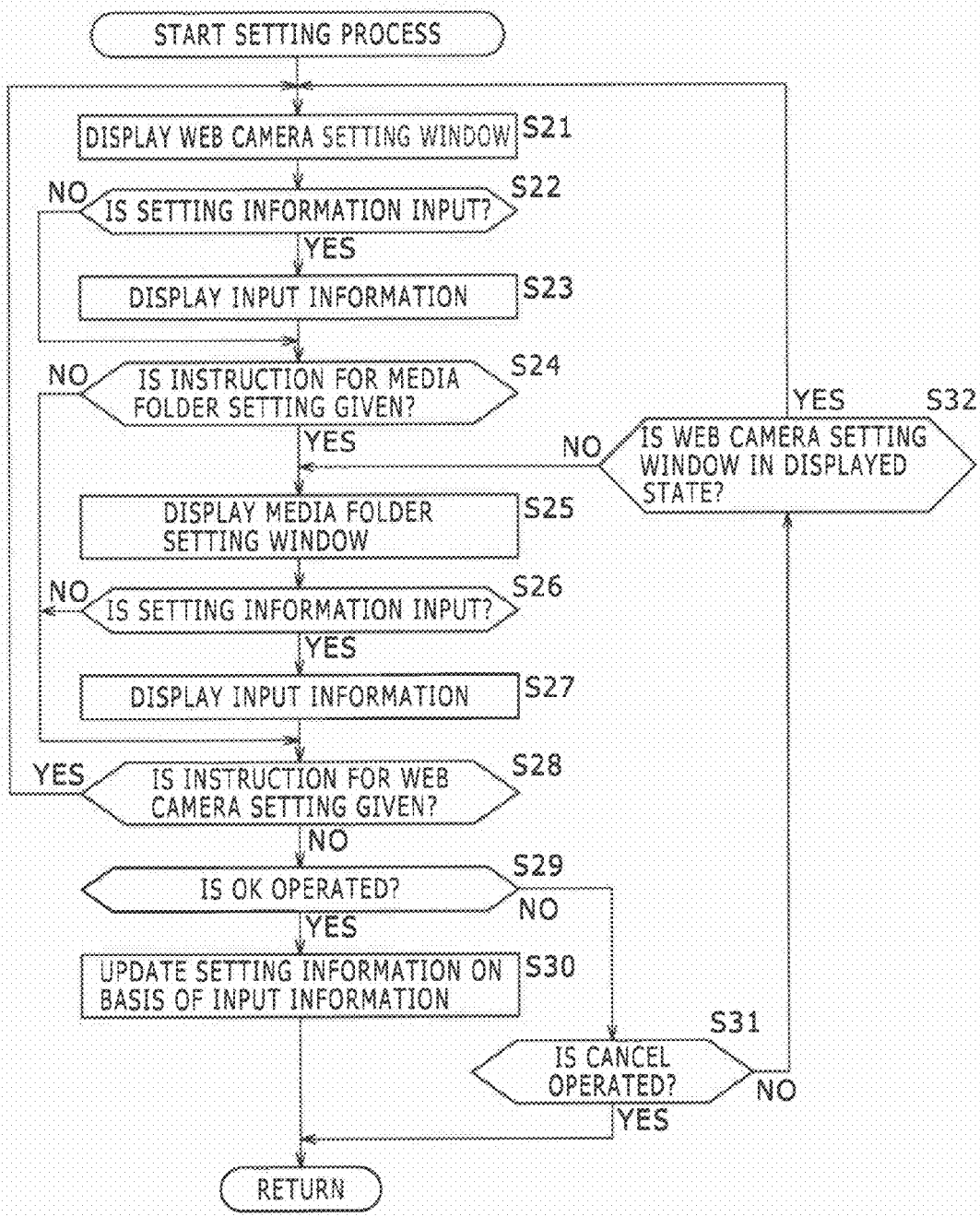
FIG. 5 is a flowchart of assistance in explaining a setting process.

The setting process will be described in the following with reference to a flowchart of FIG. 5.

In step S21, the setting information managing section 112 displays a web camera setting window 401-1 as shown in an upper part of FIG. 6, for example, as setting information. A tab 411 operated to change to a web camera setting screen and a tab 412 operated to change to a media folder setting screen are displayed in an upper part of the web camera setting window 401-1 in FIG. 6. In addition, a button 413 marked with "OK" which button is operated to complete input of setting information, a button 414 marked with "CANCEL" which button is operated to cancel input of setting information, and a button 415 operated to end input of setting information are displayed in the web camera setting window 401-1.

A video device setting section 421, a resolution setting section 422, a check box 423 for setting video mirror display, and an update button 424 indicating updating to set states are displayed from the top below the tabs 411 and 412. The video device setting section 421 allows selectable video devices to be displayed as a drop-down list by pressing a button in a right part, and selected. In addition, a check box 431 for making a setting as to whether image messages are generated with audio, an audio device setting section 432, and an audio input pin setting section 433 are displayed in a still lower part.

FIG. 6 shows that a "Visual Communication Camera" is selected as a video device. The resolution setting section 422 allows selectable resolutions to be displayed as a drop-down list by pressing a button in a right part, and selected. FIG. 6 shows that a resolution of 640 pixels×480 pixels is selected. The check box 423 is displayed with a "video mirror," and a check mark is input to the check box 423 when an image in mirror relation is displayed during display of the image picked up by the image pickup section 17. Specifically, as described above, the image pickup section 17 is disposed in the upper part of the touch panel 102, and picks up an image in a direction of facing the touch panel 102. Thus, when a user is present in front of the touch panel 102 in a state of facing the touch panel 102, and the image picked up by the image pickup section 17 is displayed on the display section 21 of the touch panel 102, the displayed image of the user is not in mirror relation to the actual orientation of the user. Then, many users feel strange about the image of themselves displayed on the touch panel 102. That is, generally, humans have many opportunities to see their reflection in a mirror. Therefore, it is difficult for a human to imagine changes in image corresponding to movements of the human when viewing an image of the human which image is not in mirror relation. Thus, there tends to occur a feeling of strangeness about left and right movements in particular. Accordingly, when the check box 423 is checked, the display section 21 displays the image picked up by the image pickup section 17 in a horizontally reversed state. As a result, a user can edit an image of the user in an editing process to be described later without the feeling of strangeness by viewing the image of the user which image is in mirror relation.

A check mark is input to the check box 431 when image messages are generated with audio. At this time, the audio device setting section 432 and the audio input pin setting section 433 are set in an operable state. The audio device setting section 432 allows selectable audio devices to be displayed as a drop-down list by pressing a button in a right part, and selected. FIG. 6 shows that a "microphone" is selected as an audio device. The audio input pin setting section 433 allows selectable audio input pins to be displayed as a drop-down list by pressing a button in a right part, and selected. FIG. 6 shows that a "master volume" is displayed, so that audio is input with the master volume of the image processing device 1.

In step S22, the setting information managing section 112 determines whether setting information for setting a web camera is input by operating the operating input section 18 of the touch panel 102 on the basis of an operating content recognized by the operating content recognizing section 113. When setting information for setting the web camera is input in step S22, for example, the setting information managing section 112 in step S23 displays setting information in a state of reflecting the input setting information on the display section 21 of the touch panel 102. When setting information for setting the web camera is not input, on the other hand, the process of step S23 is skipped.

In step S24, the setting information managing section 112 determines whether an instruction for media folder setting is given by operating the tab 412. When an instruction for media folder setting is given by operating the tab 412, for example, in step S24, the setting information managing section 112 in step S25 displays a media folder setting window 401-2 as shown in a lower part of FIG. 6, for example, on the display section 21.

The media folder setting window 401-2 has an image folder setting section 451 and a video folder setting section 452 from the top thereof, which sections set folders within the storage section 22 in which folders image messages composed of still images and moving images are respectively registered. The image folder setting section 451 and the video folder setting section 452 have reference buttons 451a and 452a in respective right parts of the image folder setting section 451 and the video folder setting section 452. The reference buttons 451a and 452a are pressed when reference is made to selectable folders. The selectable folders are displayed and made selectable by operating the reference buttons 451a and 452a. In FIG. 6, "C:YUsers" is selected for each folder, and thus a setting is made so as to make registration in the folders identified by "YUsers" on a C drive.

In step S26, the setting information managing section 112 determines whether setting information for setting media folders is input by operating the operating input section 18 of the touch panel 102 on the basis of an operating content recognized by the operating content recognizing section 113. When setting information for setting media folders is input in step S26, for example, the setting information managing section 112 in step S27 displays setting information in a state of reflecting the input setting information on the display section 21 of the touch panel 102. When setting information for setting media folders is not input, on the other hand, the process of step S27 is skipped.

Incidentally, when an instruction for media folder setting is not given in step S24, the processes of steps S25 to S27 are skipped.

In step S28, the setting information managing section 112 determines whether an instruction for web camera setting is given again by pressing the tab 411. When an instruction for web camera setting is given by pressing the tab 411, for example, the process returns to step S21. When the tab 411 is not pressed and thus an instruction for web camera setting is not given in step S28, the setting information managing section 112 in step S29 determines whether an instruction for setting completion is given with set contents as they are by pressing the button 413 marked with "OK." When the button 413 is pressed in step S29, the process proceeds to step S30.

In step S30, the setting information managing section 112 updates the setting information 201 on the basis of the respective set contents of the web camera setting window 401-1 and the media folder setting window 401-2, stores the updated setting information 201 in the storage section 22, and then ends the setting process.

When the button 413 is not pressed, and thus an instruction to complete the setting process is not given in step S29, on the other hand, the setting information managing section 112 in step S31 determines whether an instruction to cancel the setting process is given by pressing the button 414.

When the button 414 is pressed, and thus an instruction for the cancellation is given in step S31, for example, the process is ended. That is, the setting information managing section 112 ends the setting process without updating the setting information 201 irrespective of the respective set contents of the web camera setting window 401-1 and the media folder setting window 401-2. Incidentally, in step S31, whether the button 415, which is pressed when an instruction for an end is given, is pressed or not is determined as in the case of the button 414.

Further, when the button 414 is not pressed in step S31, the setting information managing section 112 in step S32 determines whether the web camera setting window 401-1 is displayed at a present time. When the web camera setting window 401-1 is displayed in step S31, the process returns to step S21. When the web camera setting window 401-1 is not displayed, the process returns to step S25. That is, unless the button 413 to 415 is operated, the processes of steps S21 to S29, S31, and S32 are repeated, the setting information is displayed, and a state allowing setting change is maintained. When the button 413 is pressed, the setting information 201 is updated so as to reflect a setting state at the time of the pressing of the button 413, and stored in the storage section 22, and then the setting process is ended. When the button 414 or 415 is pressed, the setting process is ended without the setting information 201 being updated.

As a result of the above process, the setting information for generating image messages is updated and registered.

Description will now return to the flowchart of FIG. 3.

After the setting process is ended in step S5, the process proceeds to step S6. Incidentally, when an instruction to display the setting information is not given in step S4, the process of step S5 is skipped.

In step S6, the new message registering and managing section 111 determines whether an instruction to create a new message is given on the basis of a result of recognition of an operating content of the operating input section 18 of the touch panel 102 by the operating content recognizing section 113. When an instruction to create a new message is given by pressing the icon 331 shown in FIG. 4 by a pointer not shown in the figure in step S6, for example, the process proceeds to step S7.

In step S7, the new message registering and managing section 111 creates a new message by performing a new message creating process, and registers the new message as message data 202 in the storage section 22.

[New Message Creating Process]

The new message creating process will be described in the following with reference to a flowchart of FIG. 7.

In step S41, the picked-up image display control portion 121 starts the image pickup section 17, and makes the image pickup section 17 begin picking up an image. This process makes the image pickup section 17 start picking up an image and supply the image picked up via an optical system not shown in the figures as image data to the controller 101.

Figure 8:
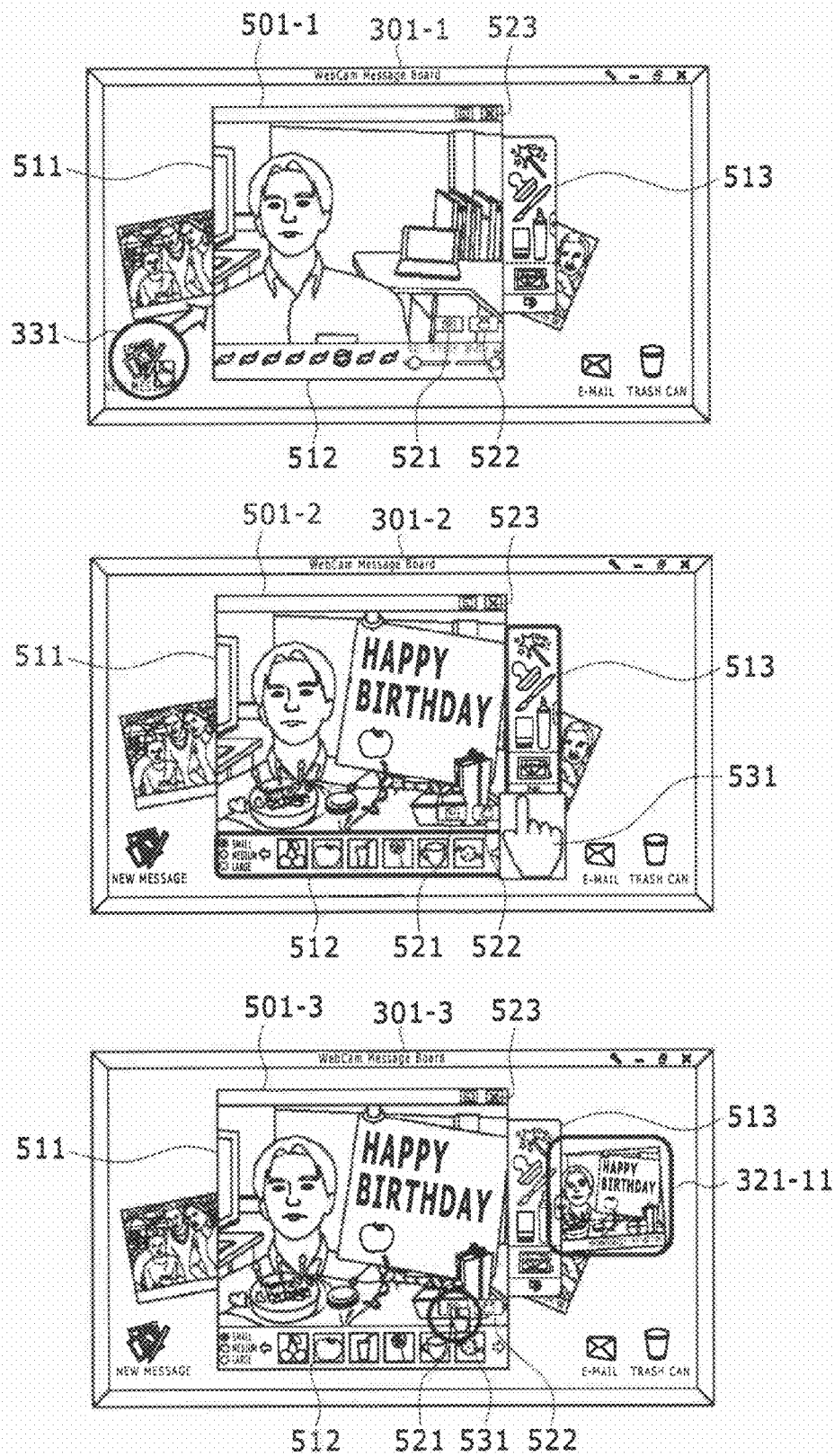
FIG. 8 is a diagram of assistance in explaining the new message creating process.

In step S42, the picked-up image display control portion 121 obtains the image picked up by the image pickup section 17, and displays the image on the display section 21 of the touch panel 102 as shown in a window 501-1 in an uppermost row part of FIG. 8, for example. The window 501-1 has a picked-up image display section 511, an edit tray display section 512, and an edit tool display section 513. The picked-up image display section 511 displays image data itself supplied from the image pickup section 17 in real time. The picked-up image display section 511 has a button 521 operated to give an instruction for a capture, a button 522 operated to give an instruction for a start and a stop of moving image recording, and a button 523 operated to end.

Incidentally, the picked-up image display section 511 in FIG. 8 displays the upper half of the body of a person whose image is picked up by the image pickup section 17. In addition, FIG. 8 shows, from the top thereof, a message board 301-1 displaying the picked-up image display section 511 in a state in which an editing process to be described later is yet to be performed, a message board 301-2 after an edit, and a message board 301-3 after a capture process to be described later.

A tray is selected and displayed in the edit tray display section 512 according to an edit tool. Kinds of edit tools include an animation edit, a stamp edit, a watercolor pen edit, an eraser edit, a pen edit, a frame edit (frame change) and the like. The uppermost row part of FIG. 8 shows a tray corresponding to the watercolor pen edit in the edit tray display section 512.

The edit tool display section 513 displays icon images indicating kinds of selectable edits as edit tools. Each of the icon images is selected to change edit contents. In the example of FIG. 8, an icon in the form of a stick with a star for selecting the animation edit, an icon in the form of a stamp for selecting the stamp edit, an icon in the form of a brush for selecting the watercolor pen edit, and an icon in the form of an eraser for selecting the eraser edit are displayed. In addition, an icon in the form of a pen for selecting the pen edit and an icon in the form of a frame for selecting the frame edit are displayed. Then, an edit tool is selected according to the type of a selected icon, and a tray displayed in the edit tray display section 512 is changed and displayed so as to correspond to the selected edit tool.

In step S43, the message edit processing portion 122 determines by the operating content recognizing section 113 whether an instruction for an editing operation is given by operating the operating input section 18 of the touch panel 102. Specifically, when an instruction for an edit is given by operating for example the edit tool display section 513 or the edit tray display section 512 displayed on the display section 21 forming the touch panel 102 by the operating input section 18, the process proceeds to step S44 to perform an editing process.

[Editing Process]

Figure 9:
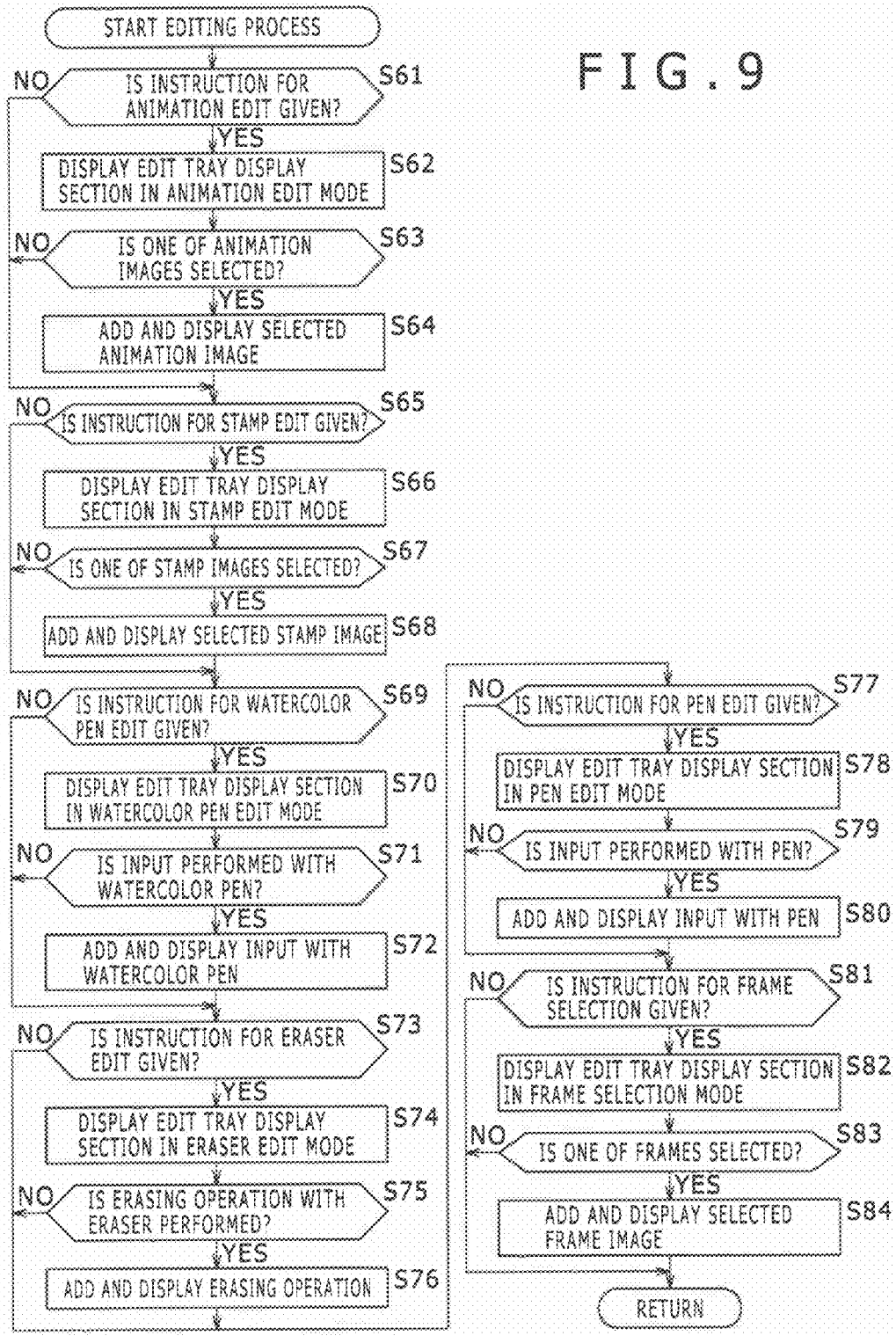
FIG. 9 is a flowchart of assistance in explaining an editing process.

The editing process will be described in the following with reference to a flowchart of FIG. 9.

In step S61, the message edit processing portion 122 determines by the operating content recognizing section 113 whether the animation edit is selected by a pointer not shown in the figure. When the icon in the form of a stick with a star in the edit tool display section 513 in FIG. 8 is selected, for example, and thus the animation edit is selected in step S61, the process proceeds to step S62.

Figure 10:
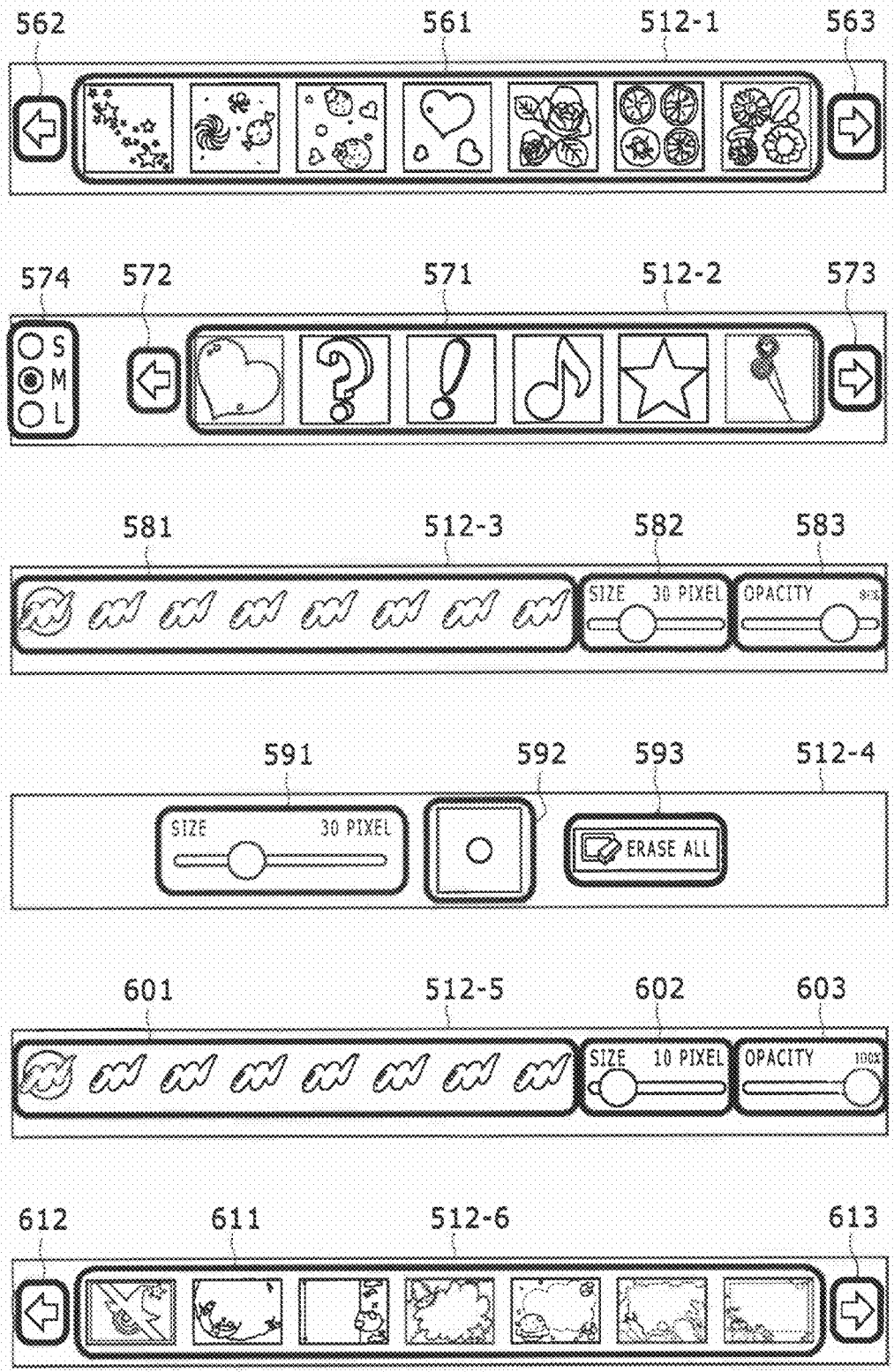
FIG. 10 is a diagram of assistance in explaining the editing process.

In step S62, the message edit processing portion 122 changes the display contents of the edit tray display section 512 to an edit tray display section 512-1 indicating an animation edit mode as shown in an uppermost row part of FIG. 10, for example, and displays the edit tray display section 512-1. The edit tray display section 512-1 indicating the animation edit displays a list display section 561, a backward button 562, and a forward button 563. In FIG. 10, the list display section 561 displays seven kinds of animation image reproduction start images as a list at a time. The list display section 561 is scrolled in a left direction each time the forward button 563 is operated, and is scrolled in a right direction each time the backward button 562 is operated. When a user selects one of the reproduction start images by a pointer not shown in the figure, the selected animation image is displayed within the picked-up image display section 511. The display position of the animation image can be changed by a drag and drop using the pointer not shown in the figure.

In step S63, the message edit processing portion 122 determines by the operating content recognizing section 113 whether one of the animation images is selected by the pointer not shown in the figure. When one of the animation images is selected in step S63, the message edit processing portion 122 in step S64 displays the selected animation image in the picked-up image display section 511. The animation image is for example an animation image in which a large number of balloons are displayed and thereafter the balloons each float up. In addition, an animation image showing the glitter of starts fading away may be prepared and displayed repeatedly. That is, when a drag operation is performed by the pointer not shown in the figure on the display surface of the display section 21 of the touch panel 102, the animation image is displayed for a while immediately after the animation image is dragged at each position to which the animation image is dragged, and is thereafter made to fade away gradually. By making such display, an animation image showing stars shining in response to dragging movements can be generated.

When the animation edit is not selected in step S61, or when no animation is selected in step S63, the process proceeds to step S65.

In step S65, the message edit processing portion 122 determines by the operating content recognizing section 113 whether the stamp edit is selected by the pointer not shown in the figure. When the icon in the form of a stamp in the edit tool display section 513 in FIG. 8 is selected, for example, and thus the stamp edit is selected in step S65, the process proceeds to step S66.

In step S66, the message edit processing portion 122 changes the display contents of the edit tray display section 512 to an edit tray display section 512-2 indicating a stamp edit mode as shown in a second row part of FIG. 10, for example, and displays the edit tray display section 512-2. The edit tray display section 512-2 indicating the stamp edit displays a list display section 571, a backward button 572, a forward button 573, and a size selecting section 574. In FIG. 10, the list display section 571 displays six kinds of stamp images as a list at a time. The list display section 571 is scrolled in a left direction each time the forward button 573 is operated, and is scrolled in a right direction each time the backward button 572 is operated. The size selecting section 574 has selecting buttons for selecting sizes of "small," "medium," and "large" from the top. In FIG. 10, "medium" is selected. When a user selects one of the stamp images by the pointer not shown in the figure, the selected stamp image is displayed within the picked-up image display section 511. The display position of the stamp image can be changed by a drag and drop using the pointer not shown in the figure.

In step S67, the message edit processing portion 122 determines by the operating content recognizing section 113 whether one of the stamp images is selected by the pointer not shown in the figure. When one of the stamp images is selected in step S67, the message edit processing portion 122 in step S68 displays the selected stamp image in the picked-up image display section 511.

When the stamp edit is not selected in step S65, or when no stamp image is selected in step S67, the process proceeds to step S69.

In step S69, the message edit processing portion 122 determines by the operating content recognizing section 113 whether the watercolor pen edit is selected by the pointer not shown in the figure. When the icon in the form of a pen in the edit tool display section 513 in FIG. 8 is selected, for example, and thus the watercolor pen edit is selected in step S69, the process proceeds to step S70.

In step S70, the message edit processing portion 122 changes the display contents of the edit tray display section 512 to an edit tray display section 512-3 indicating a watercolor pen edit mode as shown in a third row part of FIG. 10, for example, and displays the edit tray display section 512-3. The edit tray display section 512-3 indicating the watercolor pen edit displays a list display section 581, a size section 582, and an opacity section 583. In FIG. 10, the list display section 581 displays seven colors of watercolor pens as a list. The size section 582 has a knob for selecting thickness. The thickness can be set in pixel units by moving the knob to the left or right. The opacity section 583 has a knob for selecting opacity. The opacity can be set as a percentage by moving the knob to the left or right. When a watercolor pen is selected by the pointer, an image can be drawn within the picked-up image display section 511 as if the image were drawn by the watercolor pen as the pointer moves, with the thickness and the opacity set by the respective knobs in the size section 582 and the opacity section 583.

In step S71, the message edit processing portion 122 determines by the operating content recognizing section 113 whether one of the watercolor pens is selected by the pointer not shown in the figure and whether an edit is performed (whether an image is drawn). When one of the watercolor pens is selected and the movement of the pointer is started in step S71, the message edit processing portion 122 in step S72 draws an image with the watercolor pen of the selected color in the picked-up image display section 511 as the pointer is moved.

When the watercolor pen edit is not selected in step S69, or when an edit with a watercolor pen is not performed in step S71, the process proceeds to step S73.

In step S73, the message edit processing portion 122 determines by the operating content recognizing section 113 whether the eraser edit is selected by the pointer not shown in the figure. When the icon in the form of an eraser in the edit tool display section 513 in FIG. 8 is selected, for example, and thus the eraser edit is selected in step S73, the process proceeds to step S74.

In step S74, the message edit processing portion 122 changes the display contents of the edit tray display section 512 to an edit tray display section 512-4 indicating an eraser edit mode as shown in a fourth row part of FIG. 10, for example, and displays the edit tray display section 512-4. The edit tray display section 512-4 indicating the eraser edit displays a size section 591, an image section 592, and an erase all button 593. In FIG. 10, the size section 591 has a knob for selecting a size erased by the edit. The size can be set in pixel units by moving the knob to the left or right. The image section 592 displays a spot of a size equal to the size at this time. That is, a user can set the size while moving the knob in the size section 591 to the left or right and while looking at the size of the spot in the image section 592 and thereby recognizing a range to be erased. The erase all button 593 is operated to erase all the contents drawn by edits. As a result, when the eraser edit is selected by the pointer, the edited contents drawn within the picked-up image display section 511 can be erased as if the edited contents were erased by an eraser in the size set by the knob in the size section 591 as the pointer is moved. When the erase all button 593 is operated, all the edited contents are erased.

In step S75, the message edit processing portion 122 determines by the operating content recognizing section 113 whether an erasure edit is performed with the size set by the pointer not shown in the figure, or whether the erase all button 593 is pressed. When the movement of the pointer is started or the erase all button 593 is pressed in step S75, the process proceeds to step S76. That is, in step S76, the message edit processing portion 122 erases edited contents in the picked-up image display section 511 with the size set in the selected size section 591 as the pointer is moved, or erases all the edited contents.

When the eraser edit is not selected in step S73, or when the eraser edit is not performed in step S75, the process proceeds to step S77.

In step S77, the message edit processing portion 122 determines by the operating content recognizing section 113 whether the pen edit is selected by the pointer not shown in the figure. When the icon in the form of a pen in the edit tool display section 513 in FIG. 8 is selected, for example, and thus the pen edit is selected in step S77, the process proceeds to step S78.

In step S78, the message edit processing portion 122 changes the display contents of the edit tray display section 512 to an edit tray display section 512-5 indicating a pen edit mode as shown in a fifth row part of FIG. 10, for example, and displays the edit tray display section 512-5. The edit tray display section 512-5 indicating the pen edit displays a list display section 601, a size section 602, and an opacity section 603. In FIG. 10, the list display section 601 displays seven colors of pens as a list. The size section 602 has a knob for selecting thickness. The thickness can be set in pixel units by moving the knob to the left or right. The opacity section 603 has a knob for selecting opacity. The opacity can be set as a percentage by moving the knob to the left or right. When a pen is selected by the pointer, an image can be drawn within the picked-up image display section 511 as if the image were drawn by the pen as the pointer moves, with the thickness and the opacity set by the respective knobs in the size section 602 and the opacity section 603.

In step S79, the message edit processing portion 122 determines by the operating content recognizing section 113 whether one of the pens is selected by the pointer not shown in the figure and whether an edit is performed (whether an image is drawn). When one of the pens is selected and the movement of the pointer is started in step S79, the message edit processing portion 122 in step S80 draws an image with the pen of the selected color in the picked-up image display section 511 as the pointer is moved.

When the pen edit is not selected in step S77, or when an edit with a pen is not performed in step S79, the process proceeds to step S81.

In step S81, the message edit processing portion 122 determines by the operating content recognizing section 113 whether the frame edit is selected by the pointer not shown in the figure. When the icon in the form of a frame in the edit tool display section 513 in FIG. 8 is selected, for example, and thus the frame edit is selected in step S81, the process proceeds to step S82.

In step S82, the message edit processing portion 122 changes the display contents of the edit tray display section 512 to an edit tray display section 512-6 indicating a frame edit mode as shown in a sixth part of FIG. 10, for example, and displays the edit tray display section 512-6. The edit tray display section 512-6 indicating the frame edit displays a list display section 611, a backward button 612, and a forward button 613. In FIG. 10, the list display section 611 displays seven kinds of frame images as a list at a time. The list display section 611 is scrolled in a left direction each time the forward button 613 is operated, and is scrolled in a right direction each time the backward button 612 is operated. When a user selects one of the frame images by the pointer not shown in the figure, the selected frame image is displayed within the picked-up image display section 511.

In step S83, the message edit processing portion 122 determines by the operating content recognizing section 113 whether one of the frame images is selected by the pointer not shown in the figure. When one of the frame images is selected in step S83, the message edit processing portion 122 in step S84 displays the selected frame image in the picked-up image display section 511.

When the frame edit is not selected in step S81, or when no frame image is selected in step S83, the editing process is ended.

That is, an animation image, a stamp image, a watercolor pen, an eraser, a pen, and a frame image can be edited on the picked-up image display section 511 by the above process. As a result, for example, an edit can be performed from the state of the picked-up image display section 511 in the window 501-1 in FIG. 8 to the state of the picked-up image display section 511 in the window 501-2. In the window 501-2 in FIG. 8, a stamp image as of the fruit of a persimmon as well as a stamp image of a birthday cake and a present is added on a stamp image selected as a square slip of paper where "Happy Birthday" is drawn with a pen.

That is, when the button 331 for giving an instruction to create a new message is pressed, a user whose image is picked up by the image pickup section 17 and who is present in front of the touch panel 102 is displayed in the picked-up image display section 511 of the display section 21. The user can add editing operation while viewing the user himself/herself displayed in the picked-up image display section 511 by operating the operating input section 18 of the touch panel 102. The user can therefore perform an edit while viewing and enjoying edited contents added to the image of the user in real time. In addition, when a plurality of people are gathered in front of the touch panel 102 and the plurality of people are displayed in the picked-up image display section 511, all the members gathered can enjoy editing operation while viewing an edit state. Further, all the members gathered can display and enjoy an image message generated finally on the message board 301.

Figure 7:
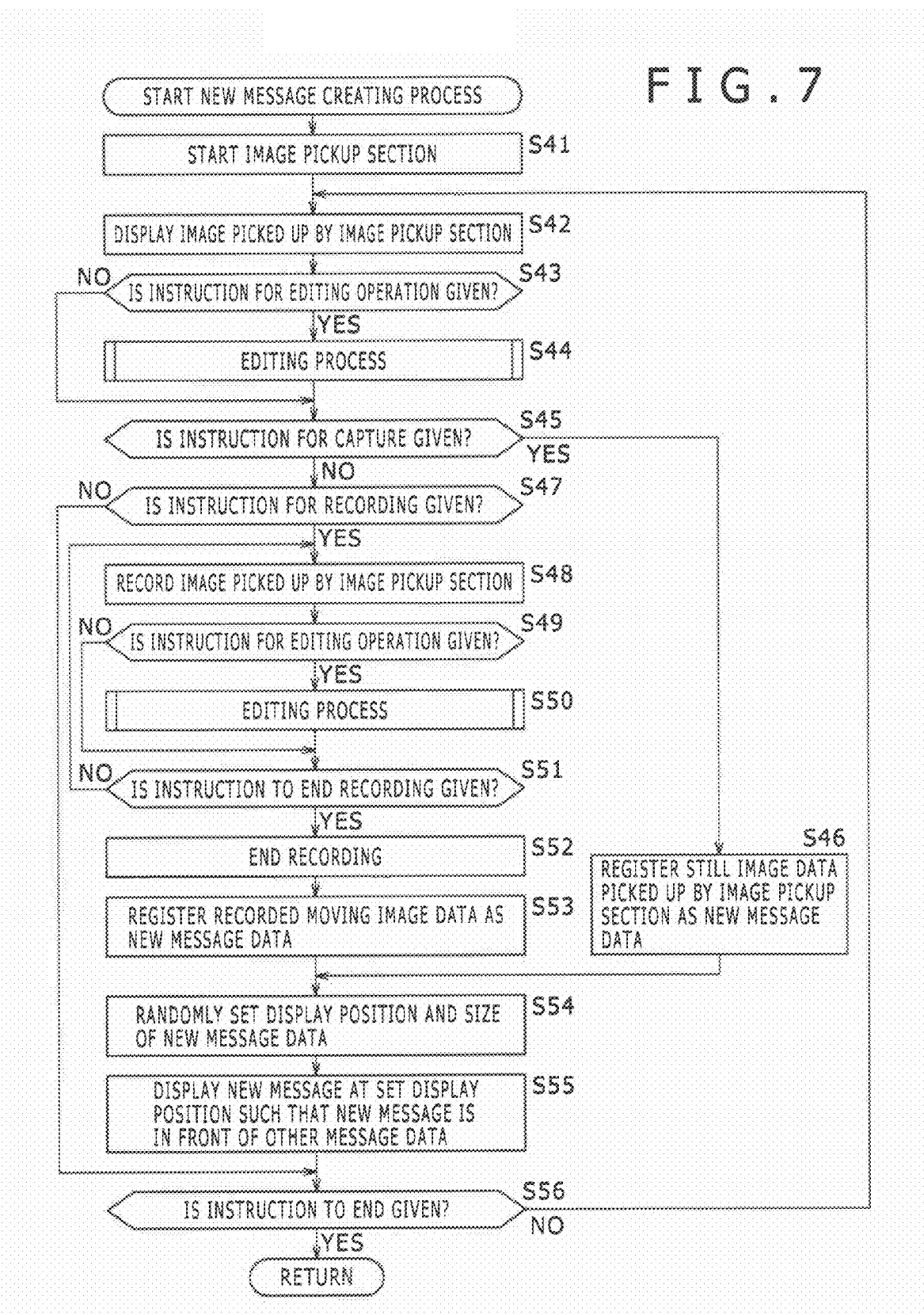
FIG. 7 is a flowchart of assistance in explaining a new message creating process.

Description will now return to the flowchart of FIG. 7.

After the picked-up image display section 511 is edited by the process of step S44 as shown in the window 501-2 in FIG. 8, for example, the process proceeds to step S45. Incidentally, when an instruction for editing operation is not given in step S43, the process of step S44 is skipped.

In step S45, the still image message generating portion 123 determines by the operating content recognizing section 113 whether an instruction for a capture is given by the pointer not shown in the figure. When the pointer 531 is operated by operating the operating input section 18, the button 521 is pressed, and thus an instruction for a capture is given in step S45, as shown in a window 501-3 in FIG. 8, for example, the process proceeds to step S46. Incidentally, because the pointer 531 in FIG. 8 is represented as an icon for convenience, and the touch panel 102 is used in this example, the pointer 531 is a finger itself of the user which finger touches a contact part forming the operating input section 18 of the touch panel 102.

In step S46, the still image message generating portion 123 reads a picked-up image displayed in the picked-up image display section 511 at a present time, generates a new image message composed of the still image, and registers the image message as message data 202 in the storage section 22. The process then proceeds to step S54. That is, a still image message or an edited still image message is generated as the image message. At this time, the still image message generating portion 123 reads the setting information 201 stored in the storage section 22, and registers the image message in the folder set in the image folder setting section 451 of the media folder setting window 401-2 in FIG. 6, for example. Incidentally, when the above-described editing process is applied to the picked-up image display section 511, the picked-up image including a result of the editing process and displayed in the picked-up image display section 511 is registered as the image message.

In step S54, the message display managing section 114 randomly sets a display size, a display position, and a rotation angle for displaying the newly registered image message.

In step S55, the message display managing section 114 reads the newly registered image message from the storage section 22, and displays the newly registered image message in the set display size, in the set display position, and at the set rotation angle in addition to already displayed image messages 321. That is, the message display managing section 114 displays the newly registered image message as an image message 321-11 on the message board 301-3 in the lowermost row part of FIG. 8, for example.

The above process makes it possible to generate an image message using an image being picked up at the present time by the image pickup section 17. In addition, at this time, the editing process can be applied to the image being picked up as described above. Further, in generating an image message, the new image message including the editing process can be generated by only operation with the pointer. As a result, it is possible to edit an image easily and then create a new image message using the image even on an electronic device using the touch panel 102, which is not very suitable for so-called keyboard input, such as the image processing device 1 according to the present embodiment.

In step S56, the new message registering and managing section 111 determines by the operating content recognizing section 113 whether an instruction to end the new message creating process is given by the pointer not shown in the figure. When the pointer not shown in the figure is operated by the operating input section 18, the button 523 is pressed, and thus an instruction to end the new message creating process is given in step S56, for example, the process is ended. When an instruction for the end is not given in step S56, the process returns to step S42.

When an instruction for a capture is not given in step S45, the moving image message generating portion 124 in step S47 determines by the operating content recognizing section 113 whether an instruction for recording is given by the pointer not shown in the figure. In step S47, when the button 522 is pressed by the pointer 531 as shown in a window 501-12 in a second row part of FIG. 11 from the state of a window 501-11 in FIG. 11, for example, an instruction for recording is considered to be given, and the process proceeds to step S48. Incidentally, the window 501-11 in FIG. 11 is in the same state as the window 501-1 in FIG. 8.

In step S48, the moving image message generating portion 124 starts recording an image being picked up by the image pickup section 17, and sequentially records the image in the folder set in the video folder setting section 452 in the media folder setting window 401-2 of FIG. 6, for example.

In step S49, as in the process of step S43, the message edit processing portion 122 determines by the operating content recognizing section 113 whether an instruction for editing operation is given by operating the operating input section 18 of the touch panel 102. Specifically, when an instruction for an edit is given by operating for example the edit tool display section 513 or the edit tray display section 512 displayed on the display section 21 forming the touch panel 102 by the operating input section 18, the process proceeds to step S50 to perform an editing process. Incidentally, the editing process in step S50 is similar to the editing process in step S44, and therefore description thereof will be omitted.

Figure 11:
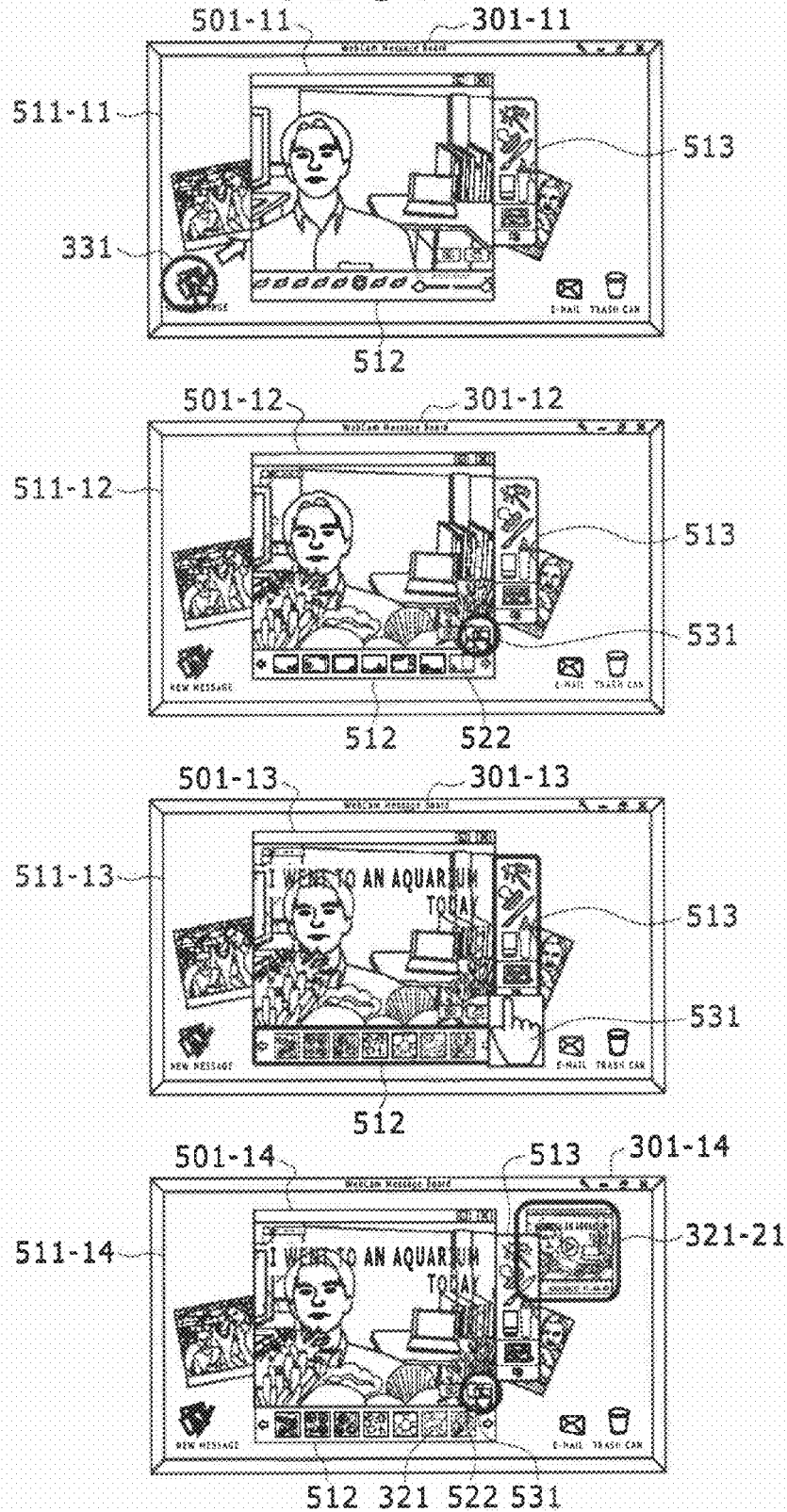
FIG. 11 is a diagram of assistance in explaining the editing process.

Specifically, when an instruction to start recording is given after an edit is performed so as to add a frame image selected as coral on a seabed, as shown in a picked-up image display section 511-12 in FIG. 11, for example, by the process of step S44, recording is started in a state of the frame image being added. Then, when characters "I went to an aquarium today" are input by the pen edit or the like, as shown in a picked-up image display section 511-13, by the editing process of step S50, a process of drawing the characters "I went to an aquarium today" is recorded.

In step S51, the moving image message generating portion 124 determines by the operating content recognizing section 113 whether an instruction to end the recording is given by the pointer not shown in the figure. When an instruction for the end is not given, the process returns to step S48. That is, the process of steps S48 to S51 is repeated until an instruction to end the recording is given. Then, when the button 522 is pressed by the pointer 531 as shown in a window 501-14 in a lowermost row part of FIG. 11, for example, in step S51, an instruction to end the recording is considered to be given, and the process proceeds to step S52.

In step S52, the moving image message generating portion 124 ends the recording of the image being picked up by the image pickup section 17.

In step S53, the moving image message generating portion 124 generates an image message on the basis of the recorded moving image data, and registers the image message as message data 202 in the storage section 22. At this time, the moving image message generating portion 124 reads the setting information 201 stored in the storage section 22, and registers the image message in the folder set in the video folder setting section 452 in the media folder setting window 401-2 of FIG. 6, for example.

Then, the process of steps S54 and S55 displays the image message 321-21 composed of the newly generated moving image, as shown on a message board 301-14 in FIG. 11. At this time, an image of a last frame of the moving image data, for example, is displayed as the image message 321-21.

Incidentally, when an instruction for recording is not given in step S47, the process of steps S48 to S55 is skipped.

The above process makes it possible to generate an image message using a moving image that is recorded while being picked up at the present time by the image pickup section 17. In addition, at this time, the editing processes can be applied to the image being picked up, as described above. Further, in generating an image message, the new image message including the editing processes can be generated by only operation (contact operation on the operating input section 18 of the touch panel 102) with the pointer. In addition, an image message in which editing processes from a start of recording to an end of the recording are all included in a moving image as they are can be generated. As a result, again, it is possible to edit a moving image easily and then create a new image message using the moving image even on an electronic device using the touch panel 102, which is not very suitable for so-called keyboard input, such as the image processing device 1 according to the present embodiment. Incidentally, when an image message using a moving image is set as an image message with audio by a setting in the check box 431 in FIG. 6 described above, the moving image including audio data together with the moving image can be generated as the image message.

In addition, it is possible to perform a desired editing process while a user himself/herself is viewing an edited state of the user using an image picked up by the image pickup section 17 in real time, then generate an image message, and display and enjoy the generated image message on the message board 301. Further, for example, it is possible for a family to sit together in a position such that an image of the family can be picked by the image pickup section 17, and for all the family to edit an image or a moving image into a desired image and then generate an image message, and display and enjoy the generated image message on the message board.

Description will now return to the flowchart of FIG. 3.

Incidentally, when an instruction to create a new message is not given in step S6, the process of step S7 is skipped.

In step S8, the reproduction processing section 115 determines by the operating content recognizing section 113 whether a display operation of an image message 321 is performed by the pointer not shown in the figure. When it is determined in step S8 that a display operation of an image message 321 is performed, for example, the process proceeds to step S9, where a message display operating process is performed.

[Message Display Operating Process]

Figure 12:
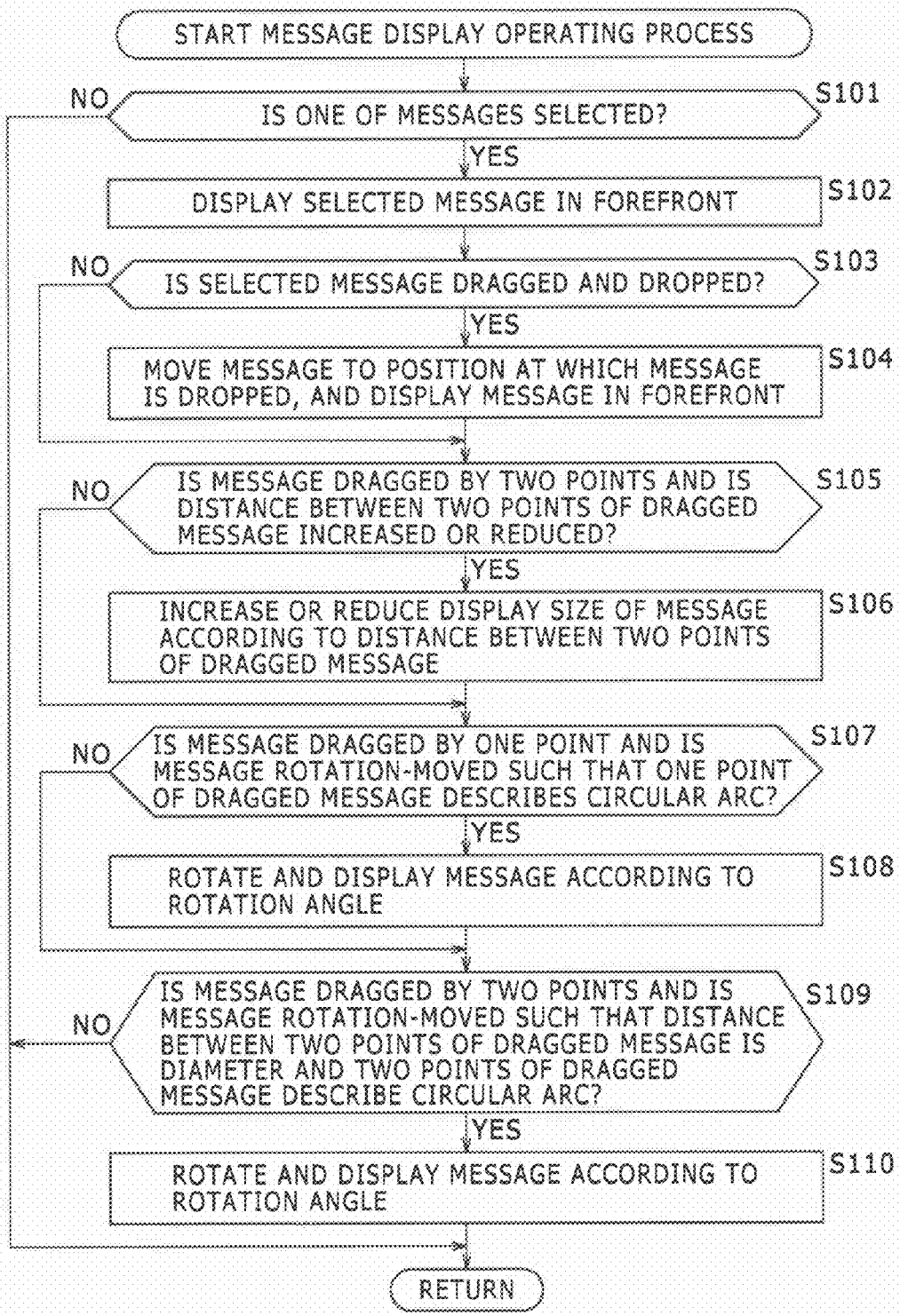
FIG. 12 is a flowchart of assistance in explaining a message display operating process.

The message display operating process will be described in the following with reference to a flowchart of FIG. 12.

In step S101, the still image reproduction processing portion 172 of the reproduction processing section 115 determines by the operating content recognizing section 113 whether one of image messages 321 is selected by the pointer 531. When an image message 321-31 is selected by the pointer 531 as shown on a message board 301-21 in an uppermost row part of FIG. 13, for example, the still image reproduction processing portion 172 advances the process to step S102.

Figure 13:
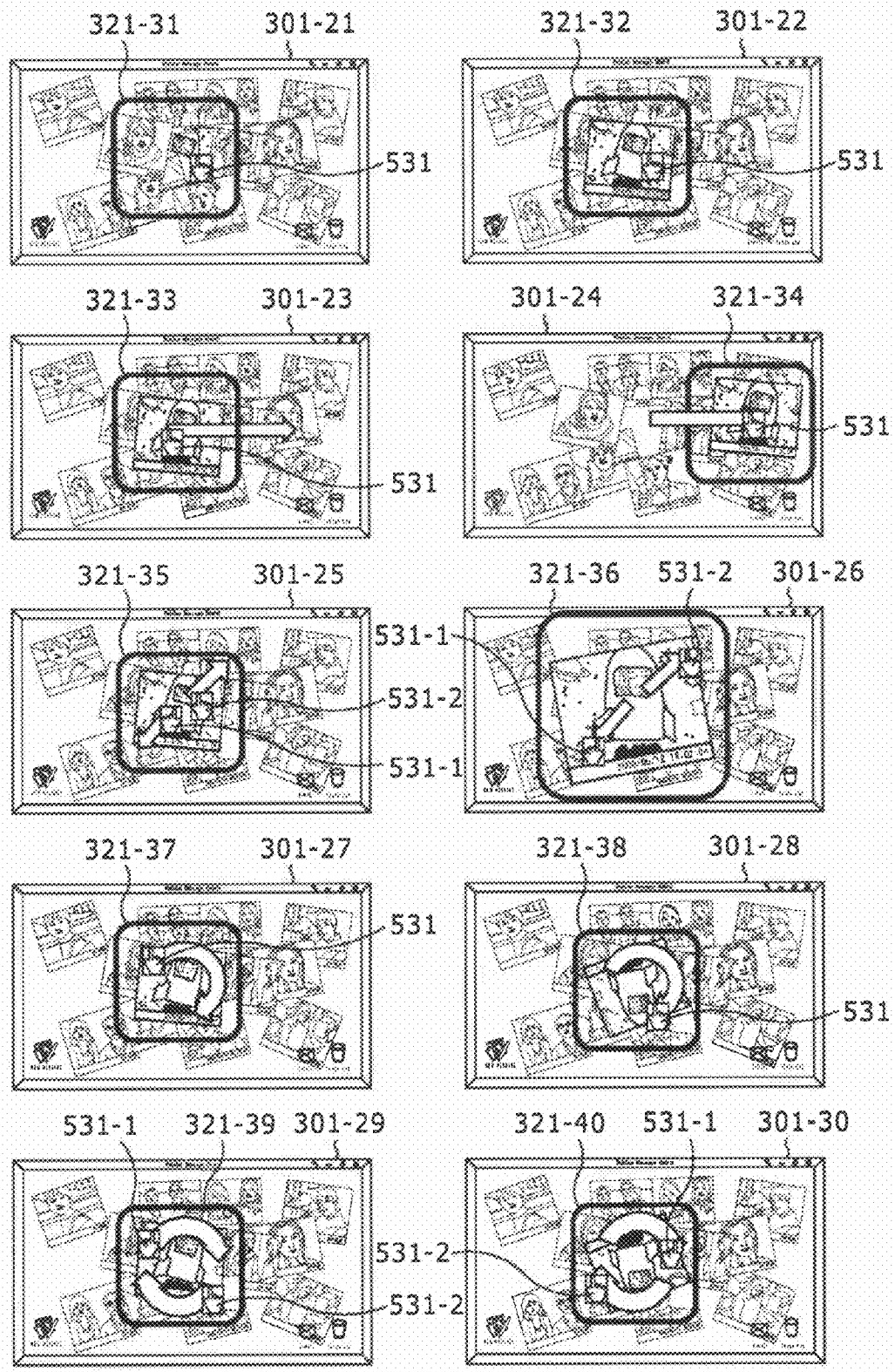
FIG. 13 is a diagram of assistance in explaining the message display operating process.

In step S102, the still image reproduction processing portion 172 changes display such that the image message is displayed in front of other image messages 321 as shown by an image message 321-32 on a message board 301-22 in FIG. 13. That is, the image messages 321 are displayed so as to overlap each other in time series from a rearmost plane to a forefront plane sequentially. The image message thus selected is displayed in the forefront, and the selected image message 321 is displayed in a highlighted state. Incidentally, such a process in effect reproduces and displays an image message composed of a still image.

In step S103, the moving operation processing portion 151 of the message display managing section 114 determines by the operating content recognizing section 113 whether the image message 321 selected by the pointer 531 is dragged and dropped. When an image message 321-33 is dragged, moved in a right direction of the figure, and dropped by the pointer 531 as on a message board 301-23 in FIG. 13, for example, in step S103, the process proceeds to step S104.

In step S104, the moving operation processing portion 151 displays an image message 321-34 at a position where the movement of the image message is ended and the image message is dropped, as shown on a message board 301-24 in FIG. 13. That is, by such a process, the image message 321 can be freely moved and displayed on the message board 301.

Incidentally, when a drag and drop is not performed in step S103, the process of step S104 is skipped.

In step S105, the enlarging and reducing operation processing portion 152 of the message display managing section 114 determines by the operating content recognizing section 113 whether the image message 321 selected by the pointer 531 is dragged by two points and whether a distance between the two points is increased or reduced. When the image message 321 is dragged by two points by pointers 531-1 and 531-2 and a distance between the two points is increased as shown on a message board 301-25 in FIG. 13, for example, in step S105, the process proceeds to step S106.

In step S106, the enlarging and reducing operation processing portion 152 displays the image message 321 in an increased size as shown by an image message 321-36 according to the distance between the two points, as shown on a message board 301-26 in FIG. 13. Incidentally, when the image message 321 is operated so as to decrease the distance between the two points, the image message 321-36 is displayed in a reduced size according to the distance between the two points. That is, by such a process, the image message 321 can be freely changed in size and displayed on the message board 301.

Incidentally, when the image message 321 is not dragged or the distance between the two points is not increased or reduced in step S105, the process of step S106 is skipped.

In step S107, the rotating operation processing portion 153 of the message display managing section 114 determines by the operating content recognizing section 113 whether the image message 321 selected by the pointer 531 is dragged by one point and operated for rotation so as to describe a circular arc with a predetermined position as a center. That is, whether the image message 321 selected by the pointer 531 is dragged by one point in a peripheral part of a display region of the image message 321 and operated for rotation so as to describe a circular arc with the center of the display region of the image message 321 as an axis is determined. When the image message 321 is dragged by one point and operated so as to describe a circular arc with a predetermined position as the center by the pointer 531 as shown on a message board 301-37 in FIG. 13, for example, in step S107, the process proceeds to step S108.

In step S108, the rotating operation processing portion 153 rotates and displays the image message 321 according to a rotation angle of a position to which the image message 321 is dragged, as shown by an image message 321-38 in FIG. 13.

That is, by such a process, the image message 321 can be freely changed in rotation angle and displayed on the message board 301.

Incidentally, when the image message 321 is not dragged by one point and operated for rotation so as to describe a circular arc in step S107, the process of step S108 is skipped.

In step S109, the rotating operation processing portion 153 of the message display managing section 114 determines by the operating content recognizing section 113 whether the image message 321 is dragged by two points and operated for rotation such that a distance between the two points is a diameter with the position of a center between the two points as an axis. That is, whether the image message 321 selected by the pointer 531 is dragged by two points in a peripheral part of a display region of the image message 321 and operated for rotation such that the distance between the two points is a diameter with the position of the center between the two points as an axis is determined. When the image message 321 is dragged by two points and operated for rotation such that the distance between the two points is a diameter with the position of the center between the two points as an axis by pointers 531-1 and 532-2 as shown on a message board 301-29 in FIG. 13, for example, in step S109, the process proceeds to step S110.

In step S110, the rotating operation processing portion 153 rotates and displays the image message 321-39 according to a rotation angle of a position to which the image message 321-39 is dragged, as shown by an image message 321-40 in FIG. 13. That is, by such a process, the image message 321 can be freely changed in rotation angle and displayed on the message board 301.

Incidentally, when the image message 321 is not dragged by two points and operated for rotation so as to describe a circular arc such that the distance between the two points is a diameter with the position of the center between the two points as an axis in step S109, the process of step S110 is skipped.

That is, the above process makes it possible to move, enlarge, reduce, or rotate an image message displayed on the touch panel 102 in a contact direction by merely touching the image message with a fingertip via the operating input section 18 in the electronic device employing the touch panel 102. Incidentally, the above image message operations may be combined with each other and performed. For example, an image message can be enlarged or reduced while rotated.

Description will now return to the flowchart of FIG. 3.

Incidentally, when the display operation of an image message is not performed in step S8, the process of step S9 is skipped.

In step S10, the moving image reproduction processing portion 171 of the reproduction processing section 115 determines by the operating content recognizing section 113 whether the reproducing button of an image message 321 is pressed by the pointer not shown in the figure to give an instruction for reproduction. When the reproducing button of an image message 321 is pressed to give an instruction for reproduction, for example, in step S10, the process proceeds to step S11, where a message reproducing process is performed.

[Message Reproducing Process]

Figure 14:
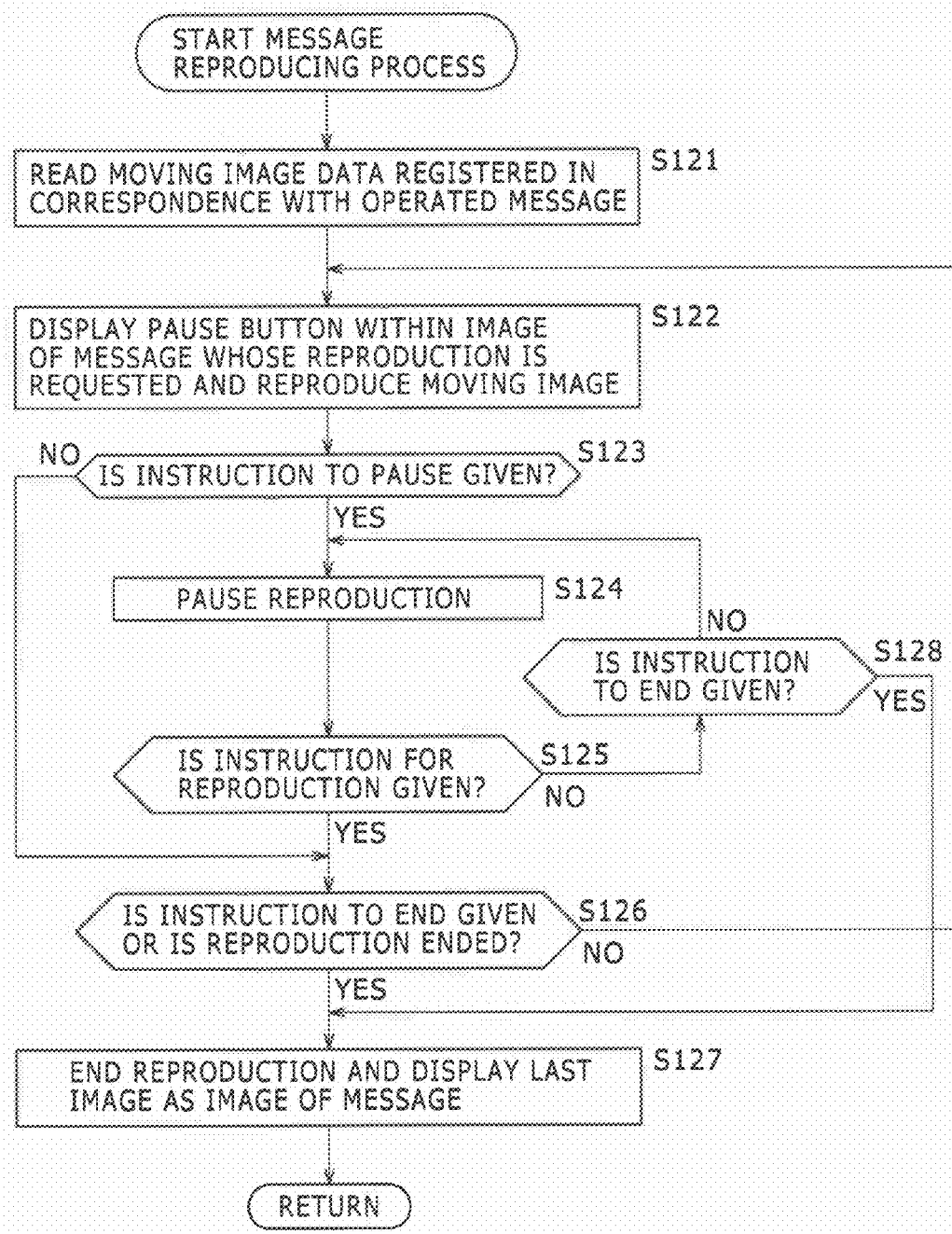
FIG. 14 is a flowchart of assistance in explaining a message reproducing process.

The message reproducing process will be described in the following with reference to a flowchart of FIG. 14.

In step S121, when a reproducing button is operated as by a pointer 531-51 in an image message 321-51 in FIG. 15, the moving image reproduction processing portion 171 reads message data 202 corresponding to the image message 321-51 from the storage section 22.

In step S122, the moving image reproduction processing portion 171 reproduces and displays the read moving image data within the image message 321-51, as shown in a lower part of FIG. 15. At this time, the moving image reproduction processing portion 171 also displays a pause button having two vertical bar-shaped objects in parallel with each other, as shown in the lower part of FIG. 15.

In step S123, the moving image reproduction processing portion 171 determines by the operating content recognizing section 113 whether the pause button is pressed by the pointer not shown in the figure to give an instruction to pause the reproduction.

When the pause button is pressed in step S123, the moving image reproduction processing portion 171 in step S124 displays the image message 321-51 of a still image formed by a frame image at the time of the reproduction pause, and also displays the reproducing button as shown in the upper part of FIG. 15.

In step S125, the moving image reproduction processing portion 171 determines whether the reproducing button is pressed. When the reproducing button is not pressed in step S125, the process proceeds to step S128. In step S128, the moving image reproduction processing portion 171 determines whether an instruction to end the reproduction of the moving image is given. When an instruction to end the reproduction of the moving image is given, for example, in step S128, the process proceeds to step S127. When an instruction to end the reproduction of the moving image is not given in step S128, the process returns to step S124. That is, the process of steps S124, S125, and S128 is repeated until an instruction to end the reproduction of the moving image is given or the reproducing button is pressed. Then, when an instruction for reproduction is given in step S125, the process proceeds to step S126.

In step S126, the moving image reproduction processing portion 171 determines whether an instruction to end the reproduction of the moving image is given or whether the reproduction of the moving image is ended. When there is no instruction to end the reproduction of the moving image and the reproduction of the moving image is not ended in step S126, the process returns to step S122. That is, the process of steps S122 to S126 is repeated until an instruction to end the reproduction is given or the reproduction is ended. Then, when an instruction to end the reproduction is given or the reproduction is ended in step S126, the moving image reproduction processing portion 171 in step S127 displays the image message 321 using the last frame of the moving image data, and ends the reproduction.

The above process makes it possible to reproduce, pause, or end midway an image message composed of a moving image. Incidentally, the upper part of FIG. 15 shows the message board 301-51 in which image messages 321-51 to 321-54 before an instruction for reproduction is given are displayed in a state of being operated by pointers 531-51 to 531-54, respectively. The lower part of FIG. 15 shows the message board 301-52 in which the image messages 321-51 to 321-54 being reproduced are displayed. A plurality of image messages may be thus reproduced simultaneously. In addition, while description has been made of an example in which a last frame is used for an image message 321 after an end of reproduction, the image message 321 may be displayed using another frame.

Description will now return to the flowchart of FIG. 3.

Incidentally, when an instruction for reproduction is not given in step S10, the process of step S11 is skipped.

In step S12, the message selection recognizing portion 192 of the electronic mail transmission managing section 116 determines by the operating content recognizing section 113 whether one of image messages is dragged and dropped at the position of the icon 332 to give an instruction to attach the image message to an electronic mail and transmit the electronic mail. When an image message 321-3 is dragged and dropped at the position of the icon 332 by the pointer 531 as indicated by an arrow on a message board 301-61 in FIG. 16, for example, an instruction to transmit an electronic mail is considered to be given, and the process proceeds to step S13.

In step S13, the electronic mail transmission managing section 116 performs a message transmitting process to attach the dropped image message to an electronic mail and then transmit the electronic mail.

[Message Transmitting Process]

Figure 17:
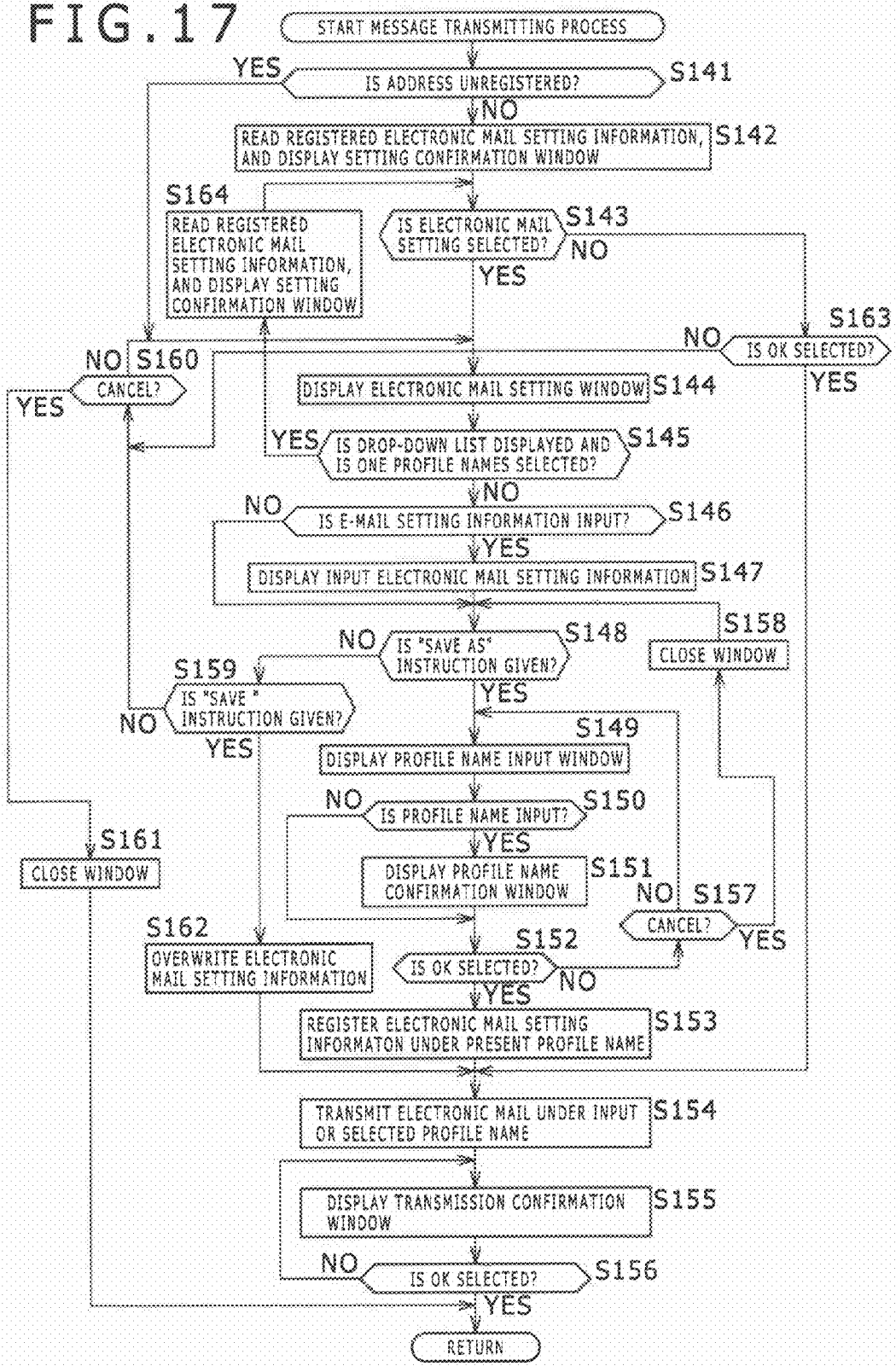
FIG. 17 is a flowchart of assistance in explaining the message transmitting process.

The message transmitting process will be described in the following with reference to a flowchart of FIG. 17.

In step S141, the electronic mail setting information registering portion 191 of the electronic mail transmission managing section 116 reads electronic mail setting information from the storage section 22, and determines whether a transmission destination address is unregistered. When a transmission destination address is unregistered, for example, in step S141, the process proceeds to step S144.

In step S144, the electronic mail setting information registering portion 191 displays a setting window 701 as shown on a message board 301-63 in FIG. 16, for example. The setting window 701 in FIG. 16 has, from the top thereof, a profile name section 711, a transmission destination address section 712, a subject section 713, a content section 714, an address section 715, an account section 716, and a password section 717. Further provided below these sections are a button 721 operated to attach a profile name to electronic mail setting information and store the electronic mail setting information, a button 722 operated to save electronic mail setting information, and a button 723 operated to cancel registration of electronic mail setting information.

The profile name section 711 is a section for displaying profile names of electronic mail setting information. When a button 711a in the form of an inverted triangle provided in a right part is pressed, a plurality of registered profile names are displayed as a drop-down list so as to be selectable by the pointer. When a profile name is selected, electronic mail setting information registered in association with the profile name is read in, and the information of the transmission destination address section 712 to the password section 717 is changed. Profile names are input at the time of new registrations, and are used to identify electronic mail setting information.

The transmission destination address section 712 is a section to which an address specifying the transmission destination of the electronic mail is input. The subject of the electronic mail to be transmitted is input to the subject section 713. The body of the electronic mail to be transmitted is input to the content section 714. The electronic mail address of a user of the image processing device 1 as a transmission source is input to the address section 715. The account name of an Internet service provider, for example, providing service to the user of the image processing device 1 as a transmission source is input to the account section 716. A password corresponding to the account name is input to the password section 717. Incidentally, when electronic mail setting information is not registered in any of the profile name section 711 to the password section 717, each of the profile name section 711 to the password section 717 is displayed in a blank state, as shown on a message board 301-63 in FIG. 16. When some piece of electronic mail setting information is registered, the contents of electronic mail setting information registered in correspondence with a profile name set nearest to the piece of electronic mail setting information are displayed in the profile name section 711 to the password section 717.

In step S145, the electronic mail edit processing portion 193 determines by the operating content recognizing section 113 whether the button 711a is pressed by operating the operating input section 18 of the touch panel 102 to display the drop-down list and whether one of profile names is selected. When the button 711a is not pressed and none of the profile names is selected in step S145, the process proceeds to step S146.

In step S146, the electronic mail edit processing portion 193 determined by the operating content recognizing section 113 whether electronic mail setting information is input to the transmission destination address section 712 to the password section 717 by operating the operating input section 18 of the touch panel 102. When electronic mail setting information is input to the transmission destination address section 712 to the password section 717, for example, in step S146, the process proceeds to step S147.

In step S147, the electronic mail edit processing portion 193 displays the input electronic mail setting information on the display section 21 of the touch panel 102, as shown on a message board 301-64 in FIG. 16, for example. On the message board 301-64 in FIG. 16, "aaa@ee.com" is input in the transmission destination address section 712, "ccc" is input in the subject section 713, and "Hello" is input as the body of the electronic mail in the content section 714. In addition, "ddd@ee.com" is input as the address of the user as transmission source in the address section 715, "ddd" is input in the account section 716, and "********" is displayed in the password section 717 so as to prevent the input characters from being viewed by a third person.

Incidentally, when it is determined in step S146 that electronic mail setting information is not input, the process of step S147 is skipped.

In step S148, the electronic mail setting information registering portion 191 determines by the operating content recognizing section 113 whether an instruction to attach a name to the input electronic mail setting information and store the electronic mail setting information is given by operating the operating input section 18 of the touch panel 102. When the button 721 of the setting window 701 is pressed by the pointer 531 as shown on the message board 301-64 in FIG. 16, for example, in step S148, an instruction to attach a name to the electronic mail setting information and store the electronic mail setting information is considered to be given, and the process proceeds to step S149.

In step S149, the electronic mail setting information registering portion 191 controls the display section 21 to display a profile name input window 741, as shown on a message board 301-65 in FIG. 16. The profile name input window 741 has a profile name input section 751 as well as a button 761 operated to give an instruction to complete an input and a button 762 operated to cancel the input of a profile name below the profile name input section 751.

In step S150, the electronic mail edit processing portion 193 determines by the operating content recognizing section 113 whether a profile name is input with the operating input section 18 functioning as a software keyboard, for example. When a profile name is input, for example, in step S150, the electronic mail edit processing portion 193 in step S151 controls the display section 21 to display the input profile name in the profile name input section 751 in FIG. 16, for example. The profile name input section 751 on the message board 301-65 in FIG. 16 displays "AAA," showing that "AAA" is input as a profile name. When it is determined in step S150 that no profile name is input, the process of step S151 is skipped.

In step S152, the electronic mail setting information registering portion 191 determines by the operating content recognizing section 113 whether the button 761 marked with "OK" is pressed by operating the operating input section 18 to give an instruction to complete the input of the profile name. When the button 761 is pressed by the pointer 531 as shown in the profile name input window 741 in FIG. 16, for example, in step S151, an instruction to complete the input of the profile name is considered to be given, and the process proceeds to step S153.

In step S153, the electronic mail setting information registering portion 191 registers the information input to the setting window 701 as electronic mail setting information 203 in the storage section 22 in association with the profile name in the profile name input section 751 of the profile name input window 741 in a present state.

In step S154, the electronic mail transmission processing portion 194 reads electronic mail setting information 203 stored in the storage section 22, and reads message data 202 corresponding to the image message 321 dropped at the position of the icon 332 in the process of step S12. Further, the electronic mail transmission processing portion 194 generates an electronic mail on the basis of the electronic mail setting information 203, and then controls the communicating section 23 to transmit the electronic mail to the transmission destination address with the read message data 202 attached to the electronic mail. At this time, the electronic mail transmission processing portion 194 performs an authentication process and the like with a server of the Internet service provider on the basis of the account name and the password included in the electronic mail setting information 203, and then transmits the created electronic mail with the image message attached to the electronic mail.

In step S155, the electronic mail transmission processing portion 194 controls the display section 21 of the touch panel 102 to display an electronic mail transmission confirmation window 791 as shown on a message board 301-66 in FIG. 16, for example. "E-mail has been transmitted" is written in the transmission confirmation window 791 in FIG. 16, showing that the transmission of the electronic mail is completed. The transmission confirmation window 791 has a button 792 marked with "OK" which button is operated to indicate confirmation.

In step S156, the electronic mail transmission processing portion 194 determines by the operating content recognizing section 113 whether a process of indicating that transmission confirmation is confirmed by the user by operating the operating input section 18 is performed (whether the button 792 showing "OK" is pressed). When it is not indicated in step S156 that the transmission confirmation is confirmed by the user, the process returns to step S155. That is, the process of steps S155 and S156 is repeated and the transmission confirmation window 791 continues to be displayed until it is indicated that the transmission confirmation is confirmed by the user.

When the button 792 shown on the message board 301-66 in FIG. 16 is pressed by the pointer not shown in the figure, for example, in step S156, it is considered to be indicated that the transmission confirmation is confirmed by the user, and the process is ended.

When the button 761 marked with "OK" is not pressed in step S152, on the other hand, the process proceeds to step S157.

In step S157, the electronic mail setting information registering portion 191 determines by the operating content recognizing section 113 whether the button 762 is pressed by operating the operating input section 18 to give an instruction to cancel. When the button 762 is not pressed and thus an instruction to cancel is not given in step S157, the process returns to step S149. That is, the process of steps S149 to S152 and S157 is repeated, and the profile name input window 741 continues to be displayed.

When the button 762 is pressed to give an instruction to cancel in step S157, the electronic mail setting information registering portion 191 in step S158 closes the display of the profile name input window 741, and the process returns to step S147. That is, because the button 762 is pressed, the registration of the profile name is considered to be cancelled, and the process returns to a state before an instruction to attach a profile name to the electronic mail setting information and store the electronic mail setting information is given.

Further, when an instruction to attach a name to the electronic mail setting information and store the electronic mail setting information is not given in step S148, the process proceeds to step S159. In step S159, the electronic mail setting information registering portion 191 determines by the operating content recognizing section 113 whether the button 722 is pressed by operating the operating input section 18 to give an instruction to save the electronic mail setting information by overwriting. When an instruction to save the electronic mail setting information by overwriting is given by operating the button 722, for example, in step S159, the process proceeds to step S162.

In step S162, the electronic mail setting information registering portion 191 saves, by overwriting, the information input in the setting window 701 as electronic mail setting information 203 in the storage section 22 in association with a registered profile name. The process then proceeds to step S154. Incidentally, because the information input in the setting window 701 cannot be saved by overwriting in association with an unregistered profile name, processing is performed so as to disable an instruction for save by overwriting for new electronic mail setting information.

When the button 722 is not operated and thus an instruction for save by overwriting is not given in step S159, on the other hand, the process proceeds to step S160. In step S160, the electronic mail setting information registering portion 191 determines by the operating content recognizing section 113 whether the button 723 is pressed by operating the operating input section 18 to give an instruction to cancel the process of transmitting the electronic mail to which the image message is attached. When the button 723 is pressed to give an instruction for cancellation in step S160, the electronic mail setting information registering portion 191 in step S161 closes the display of the setting window 701, and ends the message transmitting process. That is, in this case, electronic mail setting information is not registered, so that electronic mail cannot be transmitted. Therefore the message transmitting process is ended.

When the button 723 is not pressed and thus an instruction for cancellation is not given in step S160, the process returns to step S144. That is, the setting window 701 continues to be displayed to receive an input of electronic mail setting information.

Further, once the above process is performed, electronic mail setting information 203 is registered, and therefore a transmission destination is registered. Thus, thereafter, it is determined in the process of step S141 that the transmission destination is not unregistered, and the process proceeds to step S142.

In step S142, the electronic mail setting information registering portion 191 reads electronic mail setting information 203 stored in the storage section 22, and displays a setting confirmation window 771 as shown on a message board 301-62 in FIG. 16 on the basis of the electronic mail setting information 203. The setting confirmation window 771 displays information registered as the electronic mail setting information 203 set by the series of processes described above. Specifically, the setting confirmation window 771 displays, from the top thereof, "aaa@ee.com" as a transmission destination address, "ccc" as a subject below the transmission destination address, and "Hello," which is contents as the body of the electronic mail, below the subject. Because the setting confirmation window 771 is thus displayed, the user can check the contents registered in the electronic mail setting information.

In addition, a button 781 displayed as "E-MAIL SETTINGS" which button is pressed to set electronic mail setting information again is provided in a lower part of the setting confirmation window 771. In addition, a button 782 displayed as "OK" which button is pressed to give an instruction for transmission is provided on the right side of the button 781. Further, a button 783 displayed as "CANCEL" which button is pressed to cancel the transmission of the message is provided on the right side.

In step S143, the electronic mail setting information registering portion 191 determines by the operating content recognizing section 113 whether the button 781 is pressed by operating the operating input section 18 to give an instruction to set electronic mail setting information again. When the button 781 is pressed by the pointer not shown in the figure, for example, in step S143, an instruction to set electronic mail setting information again is considered to be given, and the process proceeds to step S144.

When the button 781 is not pressed and thus an instruction to set electronic mail setting information again is not given in step S143, on the other hand, the process proceeds to step S163.

In step S163, the electronic mail transmission processing portion 194 determines by the operating content recognizing section 113 whether the button 782 displayed as "OK" is pressed to give an instruction for electronic mail transmission. When the button 782 is pressed to give an instruction for electronic mail transmission, for example, in step S163, the process proceeds to step S154. That is, an electronic mail that has contents registered in the electronic mail setting information 203 in the present state and to which the selected image message is attached is transmitted.

When the button 782 is not pressed in step S163, that is, when an instruction for electronic mail transmission is not given in step S163, on the other hand, the process proceeds to step S160.

Further, when the button 711a is pressed to display a drop-down list, and one of profile names is selected, and further the button 722 is pressed to give an instruction for save by overwriting in step S145, the process proceeds to step S164.

In step S164, the electronic mail setting information registering portion 191 reads electronic mail setting information 203 registered in association with the selected profile name, which electronic mail setting information 203 is included in the electronic mail setting information 203 in the storage section 22, and changes the information within the setting confirmation window 771 to the read information. The process then returns to step S143.

The above process is summarized as follows. When the image message 321-3 is dropped at the position of the icon 332 as shown on the message board 301-61 in FIG. 16, for example, and when electronic mail setting information is unregistered, the registration of electronic mail setting information is prompted for in the setting window 701 as shown on the message board 301-63. When information is input to the transmission destination address section 712 to the password section 717 within the setting window 701, as shown on the message board 301-64 in FIG. 16, and then the button 721 is pressed, the profile name input window 741 is displayed, as shown on the message board 301-65.

Further, when a profile name is input to the profile name input section 751 of the profile name input window 741 on the message board 301-65, the new electronic mail setting information is registered in the storage section 22 in association with the profile name. In addition, at this time, message data registered in association with the image message 321-3 is read and attached to an electronic mail generated on the basis of the new electronic mail setting information, and the electronic mail is transmitted. As a result, the transmission confirmation window 791 is displayed as shown on the message board 301-66.

Thus, in a case where electronic mail setting information is unregistered, the process is completed after sequentially proceeding from the display state of the message board 301-61 in FIG. 16 to the states of the message boards 301-63 to 301-66 in FIG. 16.

In a case where electronic mail setting information is registered, on the other hand, when the image message 321-3 is dropped at the position of the icon 332, as shown on the message board 301-61 in FIG. 16, for example, the setting confirmation window 771 is displayed, as shown on the message board 301-62. This process presents the contents of the electronic mail setting information at the present time to the user. Further, when transmission may be made with this electronic mail setting information, the button 782 is pressed. Thereby, the message data 202 registered in association with the image message 321-3 is read and attached to an electronic mail generated on the basis of the electronic mail setting information, and the electronic mail is transmitted. As a result, the transmission confirmation window 791 is displayed as shown on the message board 301-66.

That is, once electronic mail setting information is registered, an electronic mail to which an image message is attached can be transmitted by merely dragging the image message on the message board 301 and dropping the image message onto the icon 332. Thus, a process requiring key input of a transmission destination address, a subject, and a body can be omitted. As a result, because key input can be omitted even in a case where a function for input by the user is limited to the touch panel 102 as in the image processing device 1 or the like, an electronic mail to which an image message is attached can be transmitted easily.

Description will now return to the flowchart of FIG. 3.

Incidentally, when an instruction to transmit an electronic mail to which an image message is attached is not given in step S12, the message transmitting process of step S13 is skipped.

While description has been made of an example in which one image message 321 is dragged and dropped onto the icon 332 for an instruction to transmit an electronic mail to which an image message is attached in step S12, a plurality of image messages 321 may be dragged and dropped onto the icon 332 for an instruction to transmit an electronic mail to which an image message is attached in step S12. Specifically, in the case of the touch panel 102, as shown on a message board 301-71 in FIG. 18, a plurality of image messages 321 may be simultaneously dragged and simultaneously dropped onto the icon 332 using a plurality of fingers by a method referred to as a multi-touch method. On the message board 301-71 in FIG. 18, a plurality of pointers 531-1 to 531-3 are set to the respective image messages 321-1 to 321-3 by the multi-touch method, and thereby the plurality of image messages 321-1 to 321-3 are dragged. Further, as indicated by arrows, the pointers 531-1 to 531-3 are moved to the position of the icon 332, and the image messages 321-1 to 321-3 are dropped. Thus, an instruction to transmit an electronic mail to which the image messages 321-1 to 321-3 are attached may be given, and the electronic mail to which the image messages 321-1 to 321-3 are attached may be transmitted by a similar process to that of a case where an image message 321 is dropped.

There is a case where an electronic device employing the touch panel 102 does not have the multi-touch function. In such a case, as shown in a lower part of FIG. 18, a plurality of image messages 321 may be dropped into one folder, and the folder may be dragged and dropped onto the icon 332. Specifically, on a message board 301-72 in FIG. 18, the image message 321-1 is dragged by the pointer 531-1, and dropped into a folder 795 newly provided to collect a plurality of image messages. Thereafter, sequentially and similarly, the image message 321-2 is dragged by the pointer 531-2 and dropped into the folder 795, and the image message 321-3 is dragged by the pointer 531-3 and dropped into the folder 795. As a result of this process, the image messages 321-1 to 321-3 are stored in the folder 795. Then, the folder 795 is dragged by a pointer 531-4, and dropped onto the icon 332. As a result of this process, an instruction to transmit an electronic mail to which the image messages 321-1 to 321-3 are attached may be given, and the electronic mail to which the image messages 321-1 to 321-3 are attached may be transmitted by a similar process to the above-described process.

In step S14, the trash can managing part 132 of the deletion processing portion 125 determines whether one of image messages 321 is dragged and dropped on the icon 333 to be thrown into the trash can. When the image message 321-3 is dragged by the pointer 531 and dropped on the icon 333, as shown on a message board 301-81 in FIG. 19, for example, in step S14, the image message 321-3 is considered to be thrown into the trash can, and the process proceeds to step S15.

In step S15, the trash can managing part 132 registers the image message 321-3 as trash can data 204, and updates the information of the message data 202 stored in the storage section 22. Then, the trash can managing part 132 erases the display of the image message 321-3, as shown on a message board 301-82 in FIG. 19. That is, a change is made to display of an image such that the image message 321-3 pasted on the message board 301 is stripped and thrown into the trash can. In this case, however, the information of a still image or a moving image corresponding to the image message 321-3 is left in the message data 202, and the image message of the still image or the moving image is registered in the trash can data 204 in terms of recording. In addition, as for the image message dragged to the icon 333, a plurality of image messages may be simultaneously dropped onto the icon 333 as in the message transmitting process.

Incidentally, when none of the image messages 321 is dragged and dropped onto the icon 333 in step S14, the process of step S15 is skipped.

In step S16, the trash can managing part 132 determines by the operating content recognizing section 113 whether the icon 333 indicating the trash can is pressed by operating the operating input section 18 to give an instruction to manage (organize) image messages registered in trash can data. When the pointer 531 is moved to the position of the icon 333 and the icon 333 is pressed to give an instruction to manage (organize) the trash can data 204, as shown on the message board 301-82 in FIG. 19, for example, in step S16, the process proceeds to step S17.

In step S17, the trash can managing part 132 performs a trash can managing process.

[Trash Can Managing Process]

Figure 20:
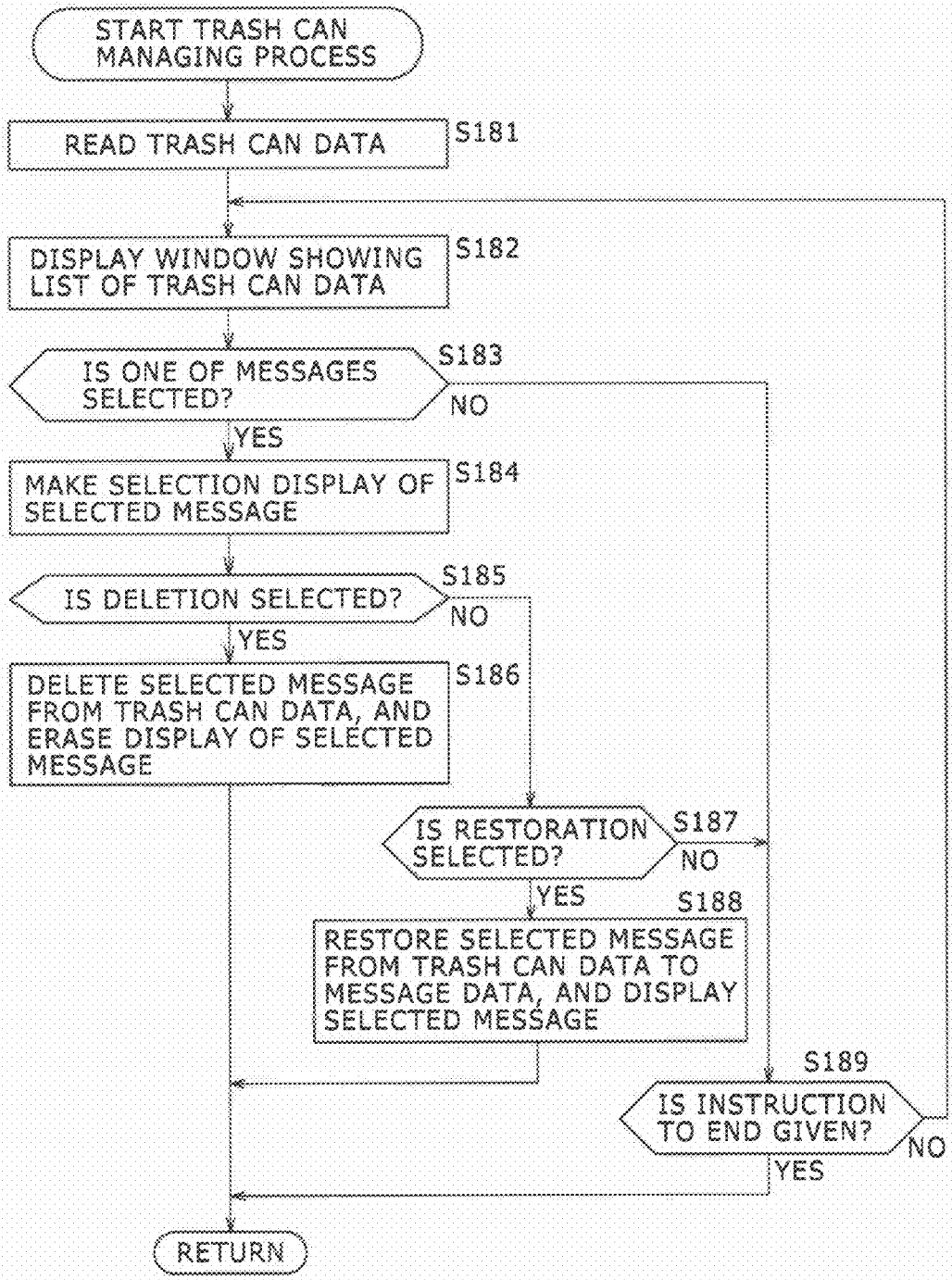
FIG. 20 is a flowchart of assistance in explaining the trash can managing process.

The trash can managing process will be described in the following with reference to a flowchart of FIG. 20.

In step S181, the trash can managing part 132 accesses the message data 202 in the storage section 22, and reads image messages registered in the trash can data 204.

Figure 19:
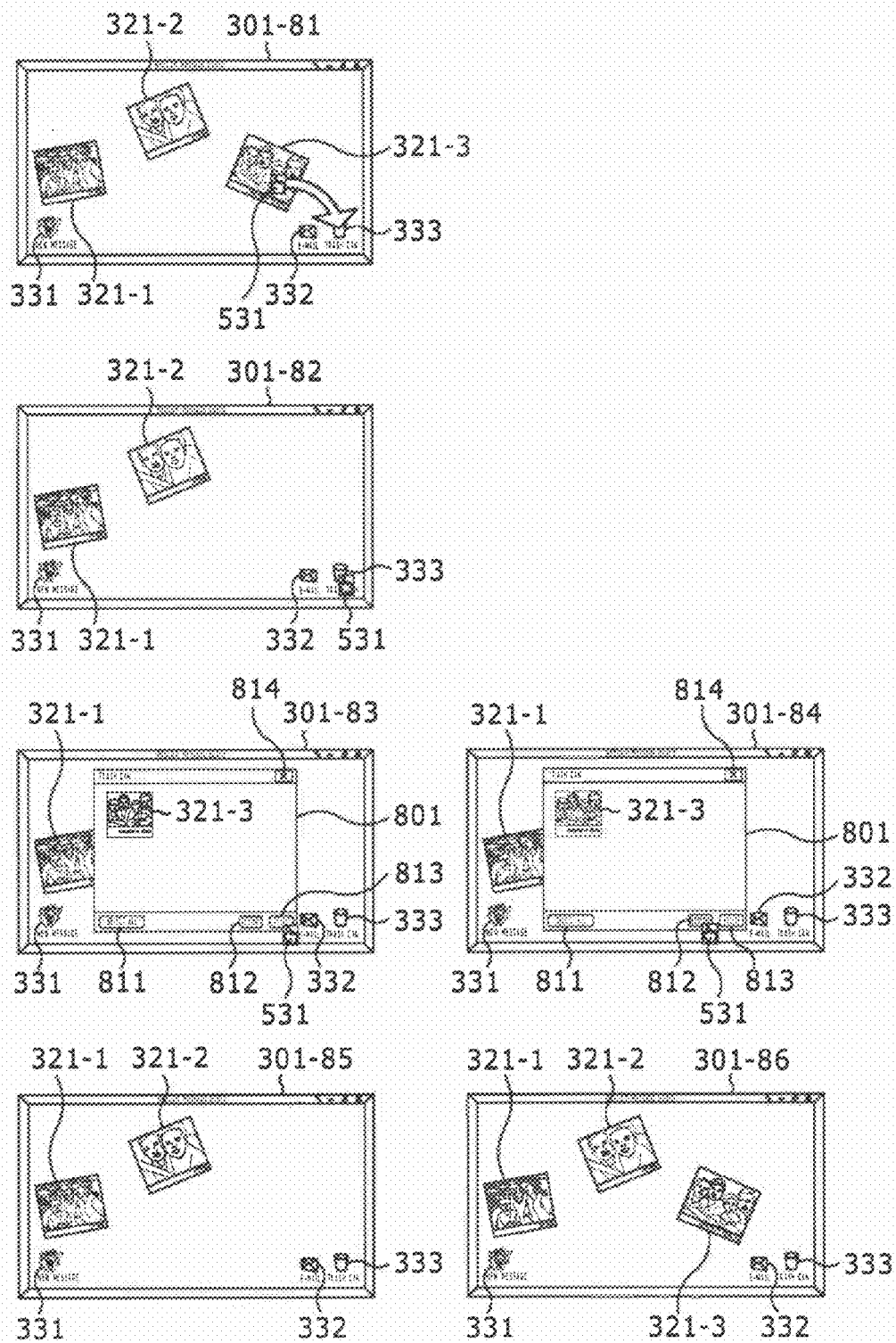
FIG. 19 is a diagram of assistance in explaining a trash can managing process.

In step S182, the trash can managing part 132 displays a trash can window 801 with the read image messages 321 as a list, as shown on a message board 301-83 in FIG. 19, for example. The image message 321-3 registered in the the trash can data 204 is displayed in the trash can window 801. In addition, the trash can window 801 has a button 811 operated to select all image messages 321 within the trash can window 801. In addition, the trash can window 801 has a button 812 operated when a selected image message 321 is desired to be restored onto the original message board 301 and a button 813 operated when a selected image message 321 is desired to be deleted completely. The buttons 812 and 813 are marked with "RESTORE" and "DELETE," respectively. In addition, the trash can window 801 has a button 814 operated to end on an upper right of the trash can window 801.

In step S183, the trash can managing part 132 determines whether one of image messages 321 is selected by the pointer not shown in the figure or the button 811. When the image message 321-3 shown in FIG. 19 is selected, for example, in step S183, the process in step S184 makes selection display of the image message 321-3 by enclosing display with a thick frame, for example, to indicate that the image message 321-3 is selected.

In step S185, the trash can managing part 132 determines by the operating content recognizing section 113 whether the button 813 is pressed by operating the operating input section 18 to select the deletion of the image message registered in the trash can data. When the button 813 is pressed by the pointer 531 to select the deletion, as shown on the message board 301-83 in FIG. 19, for example, in step S185, the process proceeds to step S186.

In step S186, the trash can managing part 132 deletes the data of the selected image message 321 from the trash can data 204 and thereby updates the trash can data 204, and erases the display of the trash can window 801, as shown on a message board 301-85 in FIG. 19. As a result of this process, the information of a still image or a moving image corresponding to the image message 321 selected to be deleted is deleted from the storage section 22, and is set in a non-restorable state. That is, in this case, the image message 321-3 is deleted completely into a non-restorable state.

When the deletion of the image message registered in the trash can data 204 is not selected in step S185, the process proceeds to step S187. In step S187, the restoration processing part 131 determines whether the restoration of the image message registered in the trash can data 204 is selected. When the button 812 is pressed by the pointer 531 to select the restoration of the image message registered in the trash can data 204, as shown on a message board 301-84 in FIG. 19, for example, in step S187, the process proceeds to step S188.

In step S188, the restoration processing part 131 deletes the selected image message 321 registered in the trash can data 204 from the trash can data 204, and reregisters the image message 321 in the message data 202. Further, the restoration processing part 131 displays the restored image message 321-3 on the message board 301 and erases the display of the trash can window 801, as shown on a message board 301-86 in FIG. 19.

This process makes it possible to restore even an image message 321 in a state of having been once deleted from the message board 301 to an original state when the image message 321 is desired to be restored. As a result, management of image messages on the message board 301 can be facilitated.

When none of the image messages is selected in step S183, or when the restoration of the image message registered in the trash can data is not selected in step S187, the process proceeds to step S189.

In step S189, the trash can managing part 132 determines by the operating content recognizing section 113 whether the button 814 is pressed by operating the operating input section 18 to give an instruction to end the trash can managing process. When an instruction to end the trash can managing process is not given in step S189, the process returns to step S182. That is, the process of steps S182 to S189 is repeated and the trash can window 801 continues to be displayed until a deleting, restoring, or ending instruction is given. Then, when the button 814 is pressed to give an instruction to end in step S189, the trash can managing process is ended.

The above process makes it possible to manage image messages 321 on the message board as if to manage pictures on a bulletin board physically. In addition, unless the process of complete deletion is performed, an image message once registered in the trash can data can be restored, and even when the image message is inadvertently deleted and needed later, the image message can be restored and used. Incidentally, while the above description has been made of an example in which one image message 321 is selected and deleted or restored, a plurality of image messages 321 can be selected and deleted or restored simultaneously.

Description will now return to the flowchart of FIG. 3.

Incidentally, when an instruction for the trash can managing process is not given in step S16, the process of step S17 is skipped.

In step S18, the message display managing section 114 determines by the operating content recognizing section 113 whether an instruction to end the message managing process is given by operating the operating input section 18. When the button 314 in FIG. 4 is pressed by the pointer not shown in the figure, for example, to give an instruction to end in step S18, the message managing process is ended. When an instruction to end the message managing process is not given in step S18, the process returns to step S3 to repeat the process from step S3 on down.

The above process makes it possible to create an image message easily from a still image or a moving image picked up in real time even with an electronic device having only an input function of a touch panel or the like. In addition, an electronic device having only an input function of a touch panel or the like can easily transmit an electronic mail to which an image message is attached. Further, these functions enable an electronic device in which key input operation is difficult such as a touch panel to transmit an electronic mail to which an image message composed of a still image or a moving image picked up in real time is attached easily and quickly.

Further, while the user checks an image of the user himself/herself and people around the user in real time, the user can edit the image and generate an image message easily while enjoying the edit by operating the touch panel 102 not only by himself/herself but also with the people around the user. In addition, because generated image messages are sequentially posted on the message board 301, the posted image messages can be viewed and enjoyed. Further, image messages can be managed on the message board 301 displayed on the touch panel 102 as if pictures were pasted and managed on a bulletin board actually present. In addition, a favorite image message can be transmitted easily by dragging and dropping the favorite image message at the position where the button for giving an instruction to transmit an electronic mail is displayed on the touch panel 102 as if to use the bulletin board actually present. Further, when an identical message board 301 is shared by a plurality of people, or for example shared between a family, the family can communicate with each other by showing image messages created by the family members to each other on the message board 301.

The series of processes described above can be carried out not only by hardware but also by software. When the series of processes is to be carried out by software, a program constituting the software is installed onto a computer. The computer in this case includes a computer incorporated in dedicated hardware, a general-purpose personal computer, for example, that can perform various functions by installing various programs thereon, and the like.

That is, the image processing device 1 of FIG. 1 may have the configuration of a general-purpose personal computer.

In the thus formed personal computer, the CPU 11 performs the series of processes described above by for example loading the program stored in the storage section 22 into the RAM 13 via the input-output interface 15 and the bus 14 and executing the program.

The program executed by the computer (CPU 11) can be provided in a state of being recorded on the removable media 25 as packaged media, for example. In addition, the program can be provided via a wired or wireless transmission medium such as a local area network, the Internet, or digital satellite broadcasting.

In the computer, the program can be installed into the storage section 22 via the input-output interface 15 by loading the removable media 25 into the drive 24. In addition, the program can be received by the communicating section 23 via a wired or wireless transmission medium and installed into the storage section 22. Further, the program can be installed in the ROM 12 or the storage section 22 in advance.

It is to be noted that in the present specification, the steps describing the program recorded on a recording medium include not only processes performed in time series in the described order but also processes not necessarily performed in time series but performed in parallel or individually.

The present application contains subject matter related to that disclosed in Japanese Priority Patent Application JP 2009-230939 filed in the Japan Patent Office on Oct. 2, 2009, and Japanese Priority Patent Application JP 2009-230940 filed in the Japan Patent Office on Oct. 2, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device having a display and an image pickup device, said image processing device comprising:
   circuitry configured to
   generate an operating signal on a basis of contact of a user with said display;
   display a bulletin board displaying an image message generated in advance to be attached to an electronic mail on said bulletin board;

display an image picked up by said image pickup device on said bulletin board together with the image message generated in advance when an operating element for transition to an image pickup mode, the operating element being displayed within said bulletin board, is operated;

generate an image message including the picked-up image and update the bulletin board to display the generated image message together with the image message generated in advance;

store setting information of said electronic mail;

when said circuitry recognizes dragging of one of the generated image message or the image message generated in advance being displayed on the updated bulletin board on a basis of an operating signal corresponding to an operation by contact of said user, and the image message is moved and dropped at a predetermined position within a display surface of said display, display a screen for generating the electronic mail to which the corresponding said image message is attached on said bulletin board; and a transmitter configured to transmit the electronic mail on a basis of the setting information of said electronic mail.

2. The image processing device according to claim 1, wherein
said circuitry subjects the displayed picked-up image to a predetermined edit, and generates an image message including the edited picked-up image to be attached to an electronic mail.

3. The image processing device according to claim 1, wherein said circuitry generates an image message composed of a still image when said circuitry generates an operating signal giving an instruction to capture the image being picked up by said image pickup device.

4. The image processing device according to claim 1, wherein
when said circuitry generates an operating signal giving an instruction to start recording of the image being picked up by said image pickup device and giving an instruction to end the recording, said circuitry generates an image message composed of a moving image from timing in which the instruction to start said recording is given to timing in which the instruction to end said recording is given, the moving image being included in the image picked up by said image pickup device.

5. The image processing device according to claim 1, wherein
said circuitry applies one of addition of an illustration and an edit by processing including at least an animation image, a stamp image, a paint in a manner of a watercolor pen, a paint in a manner of a pen, and a frame to the image being picked up by said image pickup device on a basis of an operating signal generated by said circuitry, and generates an image message from the edited image being picked up by said image pickup device on a basis of an operating signal generated by said circuitry.

6. The image processing device according to claim 1, wherein
said circuitry sequentially displays image messages generated by said circuitry such that the image messages overlap each other in time series in which the image messages are generated at random positions and in random sizes.

7. The image processing device according to claim 6, wherein
when one of a plurality of said image messages being displayed is selected on a basis of an operating signal corresponding to an operation by contact of said user, said circuitry displays the image messages such that the selected image message is in a forefront.

8. The image processing device according to claim 1, wherein
when dragging of one of a plurality of image messages being displayed is recognized on a basis of an operating signal corresponding to an operation by contact of said user, said circuitry moves and displays the corresponding image message so as to correspond to dragging movement within a display surface of said display.

9. The image processing device according to claim 1, wherein
said setting information of said electronic mail includes one of a transmission destination address, a subject, and a body of the electronic mail.

10. The image processing device according to claim 1, wherein the circuitry is configured to set the setting information of said electronic mail on a basis of an operating signal corresponding to an operation by contact of said user by said circuitry and
said circuitry sets the setting information of said electronic mail when said circuitry recognizes dragging of one of the image messages being displayed on a basis of an operating signal corresponding to an operation by contact of said user, and the image message is moved and dropped at the predetermined position within the display surface of said display, and when said setting information is not set or when an operating signal giving an instruction to set said setting information is generated.

11. The image processing device according to claim 1, wherein
when said circuitry recognizes dragging of a plurality of image messages of the image messages being displayed on a basis of an operating signal corresponding to an operation by contact of said user, and the plurality of image messages are moved and dropped at the predetermined position within the display surface of said display, said transmitter generates the electronic mail according to the setting information of the electronic mail, the setting information being stored by said circuitry, and transmits the electronic mail with said plurality of corresponding image messages attached to the electronic mail.

12. The image processing device according to claim 1, wherein
when said circuitry recognizes dragging of a folder in which a plurality of image messages of the image messages being displayed are dropped on a basis of an operating signal corresponding to an operation by contact of said user, and the folder is moved and dropped at the predetermined position within the display surface of said display, said transmitter generates the electronic mail according to the setting information of the electronic mail, the setting information being stored by said circuitry, and transmits the electronic mail with the plurality of image messages dropped in the corresponding said folder attached to the electronic mail.

13. An image processing device having a display and an image pickup device, said image processing device comprising:
means for generating an operating signal on a basis of contact of a user with said display;
means for displaying a bulletin board displaying an image message generated in advance;
means for displaying an image picked up by said image pickup device on said bulletin board together with the image message generated in advance when an operating element for transition to an image pickup mode, the operating element being displayed within said bulletin board, is operated;

means for generating an image message including the picked-up image and updating the bulletin board to display the generated image message together with the image message generated in advance;

means for storing setting information of an electronic mail;

means for, when said means for generating recognizes dragging of one of the generated image message or the image message generated in advance being displayed on the updated bulletin board on a basis of an operating signal corresponding to an operation by contact of said user, and the image message is moved and dropped at a predetermined position within a display surface of said display, displaying a screen for generating the electronic mail to which the corresponding said image message is attached on said bulletin board; and means for transmitting the electronic mail on a basis of the setting information of said electronic mail.

14. An image processing method of an image processing device having a display and an image pickup device, said image processing method comprising:

generating an operating signal on a basis of contact of a user with said display;

displaying a bulletin board displaying an image message generated in advance;

displaying an image picked up by said image pickup device on said bulletin board together with the image message generated in advance when an operating element for transition to an image pickup mode, the operating element being displayed within said bulletin board, is operated;

generating an image message including the picked-up image and updating the bulletin board to display the generated image message together with the image message generated in advance;

storing setting information of an electronic mail;

when dragging of one of the generated image message or the image message generated in advance being displayed on the updated bulletin board is recognized by the generating the operating signal on a basis of an operating signal corresponding to an operation by contact of said user, and the image message is moved and dropped at a predetermined position within a display surface of said display, displaying a screen for generating the electronic mail to which the corresponding said image message is attached on said bulletin board; and transmitting the electronic mail on a basis of the setting information of said electronic mail.

15. A non-transitory computer-readable storage medium storing computer-readable instructions thereon, which, when executed by a computer controlling an image processing device having a display and an image pickup device, cause the computer to perform a process comprising:

generating an operating signal on a basis of contact of a user with said display;

displaying a bulletin board displaying an image message generated in advance;

displaying an image picked up by said image pickup device on said bulletin board together with the image message generated in advance when an operating element for transition to an image pickup mode, the operating element being displayed within said bulletin board, is operated;

generating an image message including the picked-up image and updating the bulletin board to display the generated image message together with the image message generated in advance;

storing setting information of an electronic mail;

when dragging of one of the generated image or the image generated in advance being displayed on the updated bulletin board is recognized by the generating the operating signal on a basis of an operating signal corresponding to an operation by contact of said user, and the image message is moved and dropped at a predetermined position within a display surface of said display, displaying a screen for generating the electronic mail to which the corresponding said image message is attached on said bulletin board; and transmitting the electronic mail on a basis of the setting information of said electronic mail.

* * * * *